United States Patent
Mason

(10) Patent No.: US 11,361,144 B2
(45) Date of Patent: **\*Jun. 14, 2022**

(54) METHODS AND SYSTEMS FOR INTERACTIVE CONTENT CREATION

(71) Applicant: Turtl Surf & Immerse Limited, London (GB)

(72) Inventor: Nicholas Kingsley Mason, St Albans (GB)

(73) Assignee: TURTL SURF & IMMERSE LIMITED, London (GB)

(\*) Notice: Subject to any disclaimer, the term of this patent is extended or adjusted under 35 U.S.C. 154(b) by 0 days.

This patent is subject to a terminal disclaimer.

(21) Appl. No.: 17/503,675

(22) Filed: Oct. 18, 2021

(65) Prior Publication Data

US 2022/0035988 A1    Feb. 3, 2022

Related U.S. Application Data

(63) Continuation of application No. 17/347,899, filed on Jun. 15, 2021.

(Continued)

(51) Int. Cl.
   *G06F 17/00*    (2019.01)
   *G06F 40/103*   (2020.01)
   (Continued)

(52) U.S. Cl.
   CPC ...... *G06F 40/103* (2020.01); *G06F 16/24564* (2019.01); *G06F 40/134* (2020.01); *G06F 40/166* (2020.01)

(58) Field of Classification Search
   CPC ............. G06F 40/103; G06F 16/24564; G06F 40/134; G06F 40/166
   See application file for complete search history.

(56) References Cited

U.S. PATENT DOCUMENTS 8,219,914 B2\*  7/2012  Rauber ............ G06F 16/24573
                                                    715/730
8,752,086 B2    6/2014  Conant
(Continued)

FOREIGN PATENT DOCUMENTS

EP    3276506 A1    1/2018

OTHER PUBLICATIONS

Co-pending U.S. Appl. No. 17/347,899, inventor Mason; Nicholas Kingsley, filed Jun. 15, 2021.

*Primary Examiner* — Hassan Mrabi
(74) *Attorney, Agent, or Firm* — Wilson Sonsini Goodrich & Rosati

(57) ABSTRACT

A system is provided for personalizing an interactive content. The system comprises: a content creation component configured to create one or more content items for a document, and at least one content item is associated with a set of rules defining a link between the at least one content item and another document or a rule for assembling the at least one content into a personalized document; and a content personalization component configured to: (i) receive an instruction for personalizing a given document; (ii) assemble a plurality of content items to generate a personalized document, and the plurality of content items are pulled from the given document and at least another document based at least in part on a set of rules associated with at least one content item of the given document; and (iii) render the personalized document using a brand style associated with the given document.

20 Claims, 20 Drawing Sheets

Related U.S. Application Data

(60) Provisional application No. 63/048,512, filed on Jul. 6, 2020.

(51) Int. Cl.
*G06F 40/166* (2020.01)
*G06F 16/2455* (2019.01)
*G06F 40/134* (2020.01)

(56) References Cited

U.S. PATENT DOCUMENTS

| | | | | |
|---|---|---|---|---|
| 8,924,516 B2* | 12/2014 | Sanghavi | ............ | G06Q 30/0241 |
| | | | | 709/219 |
| 9,715,482 B1* | 7/2017 | Bjorkegren | ............. | G06F 3/013 |
| 9,727,618 B2 | 8/2017 | Sharp et al. | | |
| 9,792,270 B2 | 10/2017 | Kloiber et al. | | |
| 9,910,663 B1* | 3/2018 | Biear | ................ | H04L 67/34 |
| 9,928,230 B1* | 3/2018 | Jain | ................ | G06F 40/103 |
| 10,318,553 B2* | 6/2019 | Baum | ................ | G06F 16/35 |
| 10,402,064 B1* | 9/2019 | Al-Sallami | ........... | G06F 40/143 |
| 10,475,477 B1* | 11/2019 | Biskeborn | ............ | G11B 5/00813 |
| 10,497,401 B1* | 12/2019 | Liang | ................ | G11B 27/36 |
| 10,783,315 B2* | 9/2020 | Yoo | ................ | G06F 40/134 |
| 10,977,431 B1* | 4/2021 | Burke | ................ | G06F 40/166 |
| 2003/0176931 A1* | 9/2003 | Pednault | ............ | G06N 20/00 |
| | | | | 700/31 |
| 2004/0015408 A1 | 1/2004 | Rauen, IV et al. | | |
| 2004/0135805 A1* | 7/2004 | Gottsacker | ............. | G06Q 10/00 |
| | | | | 715/751 |
| 2009/0043755 A1* | 2/2009 | Faris | .............. | G06F 16/958 |
| 2009/0076834 A1* | 3/2009 | Rauber | ............ | G06F 16/9038 |
| | | | | 705/1.1 |
| 2010/0205032 A1* | 8/2010 | Nielsen | ............... | G06Q 10/063 |
| | | | | 705/7.11 |
| 2011/0029858 A1* | 2/2011 | Hauser | ................ | G06F 16/34 |
| | | | | 715/234 |
| 2012/0159300 A1* | 6/2012 | Vincent, III | ............ | G06F 16/80 |
| | | | | 715/222 |
| 2013/0031470 A1* | 1/2013 | Daly, Jr. | ............. | G06F 16/9535 |
| | | | | 715/243 |
| 2013/0046616 A1* | 2/2013 | Williams | ............ | G06Q 30/0251 |
| | | | | 705/14.45 |
| 2013/0151955 A1* | 6/2013 | Williams | ............... | G06F 40/169 |
| | | | | 715/255 |
| 2013/0191708 A1* | 7/2013 | Song | ..................... | G06Q 10/10 |
| | | | | 715/202 |
| 2014/0040263 A1* | 2/2014 | Sherman | ........... | G06F 16/24575 |
| | | | | 707/737 |
| 2014/0278758 A1 | 9/2014 | Christiansen et al. | | |
| 2014/0301977 A1* | 10/2014 | Nadarajah | ............ | B01D 15/424 |
| | | | | 424/85.2 |
| 2015/0040006 A1* | 2/2015 | Gentile | ................. | G06F 3/0482 |
| | | | | 715/708 |
| 2015/0081611 A1* | 3/2015 | Shivakumar | .......... | G06F 40/258 |
| | | | | 706/46 |
| 2015/0212997 A1* | 7/2015 | Kassim | .................. | G06Q 50/18 |
| | | | | 715/226 |
| 2015/0286742 A1* | 10/2015 | Zhang | ................... | G06F 40/103 |
| | | | | 715/252 |
| 2016/0062576 A1* | 3/2016 | Simon | ................... | G06F 40/166 |
| | | | | 715/731 |
| 2016/0188556 A1* | 6/2016 | Li | ......................... | G06F 16/986 |
| | | | | 715/234 |
| 2016/0232131 A1* | 8/2016 | Liu | ......................... | G06Q 10/06 |
| 2016/0232137 A1* | 8/2016 | Liu | ......................... | G06F 40/14 |
| 2016/0275453 A1* | 9/2016 | Powers | ................. | G06F 3/0482 |
| 2016/0306774 A1* | 10/2016 | Flores | .................. | G06F 40/205 |
| 2016/0306792 A1* | 10/2016 | Flores | .................. | G06F 40/103 |
| 2016/0321589 A1* | 11/2016 | Powers | ................. | G06F 16/26 |
| 2016/0344828 A1* | 11/2016 | Hausler | ................. | H04L 67/42 |
| 2016/0378720 A1* | 12/2016 | Bacus | ................... | G06F 40/103 |
| | | | | 715/251 |
| 2017/0126835 A1* | 5/2017 | Golubev | ............... | H04L 67/18 |
| 2017/0185596 A1* | 6/2017 | Spirer | ................... | H04N 21/475 |
| 2017/0262584 A1* | 9/2017 | Gallix | ................... | G06N 7/005 |
| 2017/0325006 A1 | 11/2017 | Marcus | | |
| 2018/0075525 A1* | 3/2018 | Qin | ......................... | G06Q 40/02 |
| 2018/0096203 A1* | 4/2018 | King | ..................... | G06F 40/166 |
| 2018/0137316 A1* | 5/2018 | Fischer | .............. | G06K 7/10366 |
| 2018/0268253 A1 | 9/2018 | Hoffman et al. | | |
| 2019/0129929 A1* | 5/2019 | Neylan | ................ | G06F 3/0483 |
| 2019/0259107 A1 | 8/2019 | Hollis et al. | | |
| 2019/0286667 A1* | 9/2019 | Puzicha | ............... | G06F 40/166 |
| 2019/0286668 A1* | 9/2019 | Puzicha | ............... | G06F 16/93 |
| 2019/0347668 A1 | 11/2019 | Williams et al. | | |
| 2020/0183553 A1* | 6/2020 | Al-Sallami | .......... | G06F 3/0484 |
| 2020/0183555 A1* | 6/2020 | Al-Sallami | .......... | G06F 3/0484 |
| 2021/0019364 A1* | 1/2021 | Govindjee | ............ | G06F 16/337 |
| 2021/0090097 A1* | 3/2021 | Froman | ............... | G06Q 30/0201 |
| 2021/0133670 A1* | 5/2021 | Cella | ..................... | G06N 20/20 |
| 2021/0182995 A1* | 6/2021 | Cella | ..................... | G06F 16/283 |
| 2021/0216579 A1* | 7/2021 | Stelmar Netto | ... | G06K 9/00302 |

* cited by examiner

METHODS AND SYSTEMS FOR INTERACTIVE CONTENT CREATION

CROSS-REFERENCE TO RELATED APPLICATIONS

This application is a continuation of U.S. application Ser. No. 17/347,899, filed Jun. 15, 2021, which claims the priority and benefit of U.S. Provisional Application No. 63/048,512 filed on Jul. 6, 2020, the entire contents of which is incorporated herein by reference.

BACKGROUND

Enterprises use documents to communicate with internal and external customers as well as to regulate and control process flows. Users can interact with documents through the course of business. For example, customer service representatives (CSRs) interact with correspondence systems to create customized letters, insurance agents customize group policies, employees fill out forms for HR processes, and sales people create tailored proposals. Current content creation systems and methods may face the challenge of providing highly personalized content specific to a reader or a process without going through a time-consuming creation process. Therefore, a need exists for an interactive content creation system or method with improved personalization capability and efficiency.

SUMMARY

The present disclosure provides methods and systems for creating interactive content with improved efficiency and personalization capability. In particular, methods and systems of the present disclosure may provide automation and modular features allowing for creation of personalized content (e.g., report, brochures, digital magazines, product guides, sales playbooks, sales proposals, whitepapers, newsletters, company handbooks, annual reports, etc.) with reduced time and improved personalization. In some cases, a document assembly can be generated on the fly in response to a personalization request by pulling modular content items from different documents such that only relevant content is presented to a customer/reader. Additionally, the presentation format or style of rendering a given content can be independently modified at runtime thereby allowing for improved flexibility for providing a personalized content. Moreover, the provided system provides analytics features for tracking reader's interaction with the content and extracting insight through an integrated platform in a convenient manner. Such insight can be utilized for customizing future documents or contents.

In an aspect of the present disclosure, a system is provided for automatically assembling an interactive document. The system comprises: a server in communication with a plurality of user devices over a network, wherein the server comprises: a memory for storing a set of software instructions, and one or more processors configured to execute the set of software instructions to: (a) embed a first set of rules into a first modular item of a first document; (b) receive one or more parameters for personalizing the first document; (c) pull a second modular item from a second document based at least in part on a value of the one or more parameters and the first set of rules; and (e) assemble the second modular item with the first document to generate a derivative document.

In some embodiments, the first modular item is stored in a structured data that defines the first set of rules. In some embodiments, the first set of rules define a link between the first modular item and another document or a rule for assembling the first modular item into a derivative document.

In some embodiments, the value of the one or more parameters is specified by a user via a user interface. In some cases, the user interface displays one or more personalization fields that are automatically generated based on the first set of rules. For instances, at least one of the one or more personalization fields is generated based on a second set of rules associated with the second modular item. In some instances, the one or more processors are further configured to: upon receiving an input in a given personalization field, display at least a portion of the content from the first document that is related to the given personalization field.

In some embodiments, the value of the one or more parameters is specified by a user in a text file. In some embodiments, the first set of rules includes a mapping relationship that maps the first modular item to a style for rendering the first modular item. In some cases, the derivative document is displayed to a reader using the mapped style. For example, the server is configured to collect data about the reader's interaction with the derivative document to extract insight data.

In some embodiments, the one or more processors are configured to further receive an instruction for personalizing the first modular item or the second modular item. In some embodiments, the one or more processors are configured to further store the one or more parameters and a reference to the first document for updating the derivative document. In some cases, the one or more processors are configured to further convert the derivative document into a master document by storing the one or more parameters as a set of rules associated with the derivative document.

In another aspect, a system is provided for personalizing an interactive document. The system comprises: (a) a first component configured to create one or more modular items of a document, wherein at least one modular item is associated with a set of rules defining a link between the at least one modular item and another document or a rule for assembling the at least one modular item into a derivative document; and (b) a second component configured to: (i) receive an instruction for personalizing a given document; (ii) assemble a plurality of modular items to generate a derivative document of the given document, wherein the plurality of modular items are pulled from the given document and at least another document based at least in part on a set of rules associated with at least one modular item of the given document; and (iii) render the derivative document using a style associated with the given document.

In some embodiments, the first component comprises a first user interface configured to receive a user input to generate the first set of rules. In some cases, the first user interface displays a plurality of fields for defining the first set of rules. In some embodiments, the first component comprises a second user interface configured to receive user input to customize the one or more modular items. In some embodiments, at least one of the one or more modular items is automatically updated based on an input information obtained via an application programming interface (API).

In some embodiments, the set of rules associated with the at least one modular item of the given document is predefined and embedded with the at least one item. In some cases, the at least one item is stored in a structured data that defines the set of rules. In some embodiments, the set of rules associated with the at least one item of the given document includes a mapping relationship that maps the at least one item to the style. In some embodiments, the second component comprises a user interface for receiving the instruction for personalizing the given document. In some cases, the user interface displays one or more personalization fields based on the set of rules associated with the at least one item of the given document. For example, the user instruction comprises a value provided to the one or more personalization fields.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein) of which:

DETAILED DESCRIPTION

Figure 1:
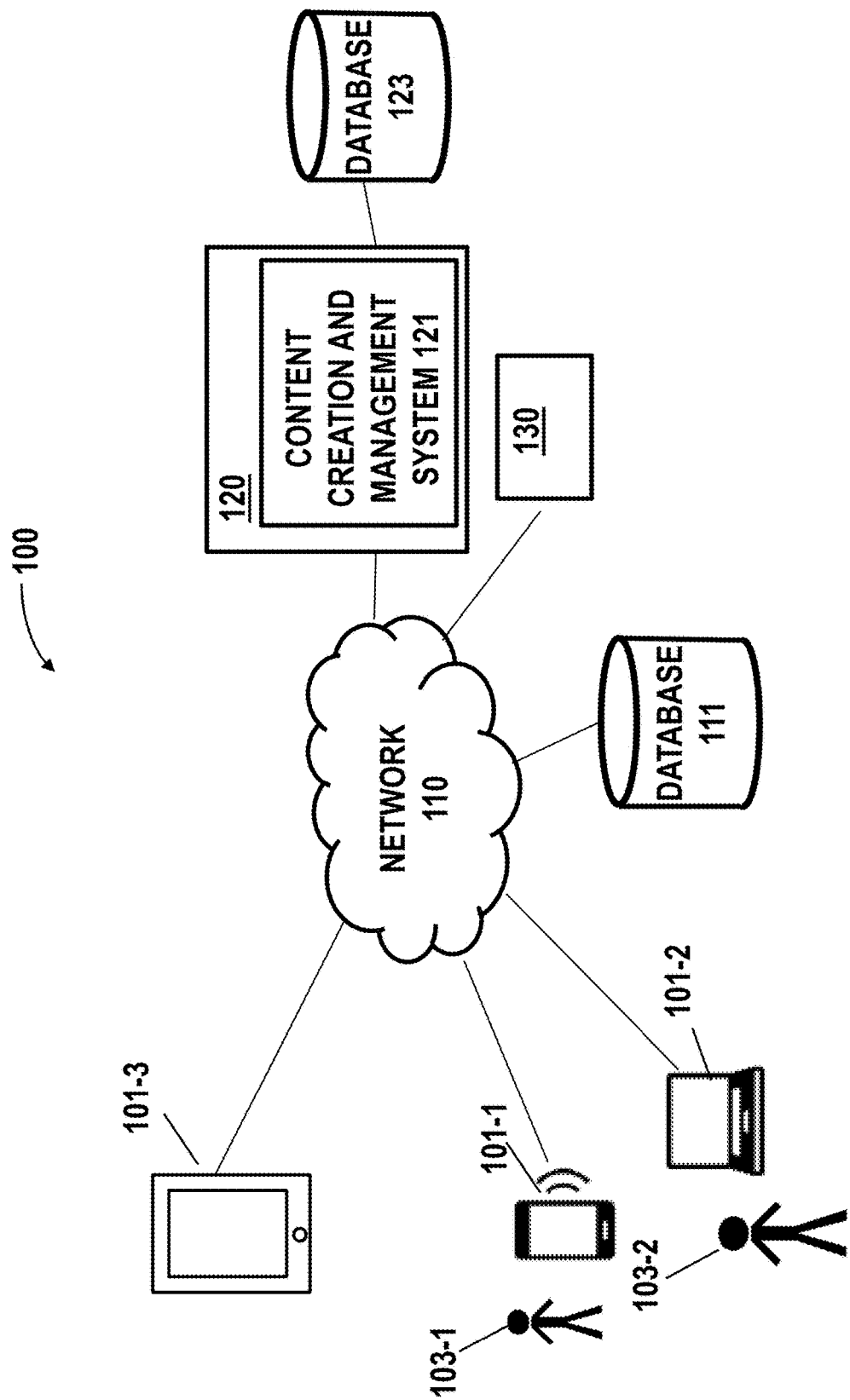
FIG. 1 schematically shows a network or content creation and management platform in which the method and system for personalizing a content can be implemented.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The present disclosure provides methods and systems for creating interactive content with improved efficiency and personalization capability. In particular, methods and systems of the present disclosure may provide automation and modular features allowing for creation of personalized content (e.g., report, brochures, digital magazines, product guides, sales playbooks, sales proposals, whitepapers, newsletters, company handbooks, annual reports, etc.) with reduced time and improved personalization.

Unlike conventional document processing systems where content is stored and managed as a document. The provided system may break a document into one or more modular content items each is associated with a set of assembly rules. In some cases, a document assembly can be generated on the fly in response to a personalization request by pulling modular content items from different documents such that only relevant content is presented to a customer/reader. Additionally, the presentation format or style of rendering a given content can be independently modified at runtime thereby allowing for improved flexibility for providing a personalized content. Moreover, the provided system provides analytics features for tracking reader's interaction with the content and extracting insight through an integrated platform in a convenient manner. Such insight can be utilized for customizing future documents or contents.

The interactive content may include a variety types of electronic documents such as report, brochures, digital magazines, case studies, product guides, sales playbooks, sales proposals, whitepapers, newsletters, company handbooks, annual reports, presentations, and various others that may be utilized in various other fields. The interactive content may be provided for a wide range of use cases. For instance, the interactive content may be a digital magazine including editorial layouts with video and reader polling to collect analytics about which topics that a reader may be interested about; a research report with interactive charts, video, and imagery that can identify which data sets and storylines are of interest to the audience; a product guide with dynamic guides on a product or service that can collect reader engagement data to deliver insights to sales; a sales playbook with messaging, product videos, templates and guides accessible from a single uniform resource location (URL) that can keep track of individuals engagement with the resources and various others.

As utilized herein, the term "document" and "electronic document" may encompass one or more types of content/documents as described above, one or more content items such as content pages (e.g., web pages), text pages, presentation slides, search results, emails, applications, IM messages, audio content or files, video content or files, online media files, other files, other data or applications that may reside on one or several (e.g., a network) of computer systems, or other definable concepts or content. A content item may be a page, a slide or elements within a page or slide (e.g., video, charts, etc.). In some cases, a document or content may include a plurality of pages or a plurality of modular content items. A page may include visible components, such as text, images, hyperlinks, a background, and/or invisible components, such as meta tags, ruleset for assembly or formatting instructions. The term "page" may encompass any types of computer files that are not necessarily encoded for viewing using a browser, e.g., text files, bitmaps, audio files, and so forth. In some cases, a document created by the provided system can be accessible from a uniform resource location (URL). For instance, a document may be a hypertext file or document that is encoded using a language such as Hypertext Markup Language (HTML) for viewing on a client computer using a browser application. Alternatively or in addition to, a document can be delivered or downloaded to a user device and can be interacted with offline using a desktop application. It should be appreciated that the same system and method may be applied to other forms of documents or electronic documents.

A user of the provided content creation and management system may be an individual, an entity (e.g., business, company, organization, etc.), a group of individuals that may be authors or content creators who create the core materials, new documents or new components of the interactive content that can be further personalized. The users may include individuals such as personalizers (e.g., marketing managers, content managers, sales people, recruiters, marketers, etc.) who are customizing and personalizing the documents created by the authors in a pre-defined way. A user of the provided system or platform may also include individuals (e.g., analyzers) who may seek for and analyze the content performance analytics collected by the interactive content that is tailored to the customer. A user of the provided content creation and management system may also include administers who manage the various workflow (e.g., content creation, content personalization) and various other functions of the platform.

The interactive content creation and personalization system may provide a dynamic document assembly feature permitting various content items (e.g., pages, slides, charts, texts, diagrams, videos, etc.) to be pulled from different documents are dynamically assembled as a new document. For example, three pages may be pulled from document A, five pages may be pulled from document B and two pages may be pulled from document C. Such pages are then assembled on the fly into a new resulting document D. Creating an interactive document in such a modular manner may allow for a highly customized/personalized document provided to a reader.

The modular content items may be automatically selected from one or more documents to be assembled into a personalized document assembly based on pre-determined assembly rules. In some cases, the assembly rules may define the conditions to meet in order to include a content item into a derivative/output document. The assembly rules may be embedded into the modular content items and may define the parameters/conditions to meet in order to display/select the associated content item or to assemble the associated content with other qualifying content. The personalized document assembly may be generated with minimal user input that specifies the personalization request parameters. For example, a user (e.g., marketing managers, content managers, sales people, recruiters, marketers, etc) may not be required to possess content creation expertise and only the information about the personalization request (e.g., document size, geolocation, customer sector, etc.) or desired use application of the document may be provided by the user. In some cases, the personalized document assembly may also be referred to as derivative document which are utilized interchangeably throughout the specification. In some cases, the document that is used to generate the personalized document may be a master document or source document. Upon creation of the derivative document, a link or connection between the source document and the derivative document may be created. Details about the dynamic document assembly method and systems are described later herein.

In some cases, the content creation and management system may also provide a reader analytics capability that can be utilized to track, analyze and extract insight about how a reader interact with the personalized content. For example, the interactive document may be rendered with tracking features (e.g., web analytics tracker), or delivered with insight metrics, analytics, or interfaces capable of extracting intelligence and insight for a variety of applications. For instance, data may be collected indicative of user interaction with the document. In some cases, the interaction data may be analyzed to extract metrics and usage analytics measuring the degree to which slides/pages were provided or made available to and viewed by customers (e.g., the number of times a content item was pitched to customers), to extract performance metrics measuring the degree to which readers have engaged with (e.g., read, edited, shared, saved) the interactive content (e.g., the dwell time on an item, such as the amount of time that the content was displayed in a content viewer (e.g., web browser or other application), to extract impact analytics indicative of the content's impact on business metrics (e.g., average revenue per pitch of a content item that may be obtained from other systems, such as customer relationship management (CRM) systems, marketing automation systems, etc.), and various other analytics. Such analytics may be used to personalize a future interactive content/document.

In some cases, the provided systems may employ artificial intelligence techniques to analyze the reader interaction data to extract the intelligence and insight, or optimize assembly rules for assembling personalized/customized content or document. In some instances, the assembly rules may be initially defined by a user (e.g., author, content creator) and automatically updated or improved over time using a trained model based on newly collected analytics data. Alternatively or additionally, a trained model may guide and assist a user during the process of creating the assembly rules for a given content item.

Artificial intelligence, including machine learning algorithms, may be used to train a predictive model for extracting the usage analytics, performance analytics, impact analytics as described above, and/or assisting assembly rules creation and management, and various other functionalities as described above. A machine learning algorithm may be a neural network, for example. Examples of neural networks that may be used with embodiments herein may include a deep neural network, convolutional neural network (CNN), and recurrent neural network (RNN). In some cases, a machine learning algorithm trained model may be pre-trained and implemented on the provided content creation and management system, and the pre-trained model may undergo continual re-training that may involve continual tuning of the predictive model or a component of the predictive model (e.g., classifier) to adapt to changes in the implementation environment over time (e.g., changes in the customer/user data, insight and analytics data, model performance, third-party data, etc.).

The term "labeled data" or "labeled dataset," as used herein, generally refers to a paired dataset used for training a model using supervised learning. The labeled data may be generated by expert or using insight extracted from customer/reader feedback data. Alternatively, methods provided herein may utilize an un-paired training approach allowing a machine learning method to train and apply on existing datasets that may be available with an existing system.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "unit" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

FIG. 1 schematically shows a network or content creation and management platform 100 in which the method and system for providing a personalized content can be implemented. A platform 100 may include one or more user devices 101-1, 101-2, 101-3, a server 120, a content creation and management system 121, one or more third-party systems 130, and a database 111, 123. Each of the components 101-1, 101-2, 101-3, 111, 123, 120, 130 may be operatively connected to one another via a network 110 or any type of communication link that allows transmission of data from one component to another.

The content creation and management system 121 may be configured to permit users (e.g., creators, personalizers, analyzers, administers, etc.) to create content and content items, generate a set of rules associated with a content item, customize a document and manage various aspects of the platform. The content creation and management system 121 may include a plurality of functional components such as a content creation unit, a document assembly engine, a data management unit, interaction tracking features, analytics features, brand management features and the like. Details about the various functional components are described later herein.

In some cases, one or more personalization fields may be provided to a user 103-1 (e.g., personalizer) via a graphical user interface (GUI) on a user device 101-1, 101-3. For example, a user may select a parameter from a plurality of options for a personalization field to customize a document that is to be delivered to a specific reader/customer. Details about the personalizer interface are described later herein. In some cases, a graphical user interface (GUI) may be rendered on a user device 101-2 for a user (e.g., content creator, author) to define one or more rules associated with a content item (e.g., page, slide). The one or more rules may include assembly rules that define when a content item should be included for display in a derivative document and/or rules that define how the content item is rendered/displayed (e.g., mapping to a brand style).

In some cases, the content creation and management system 121 may be configured to train one or more predictive models (e.g., natural language processing) for analyzing the reader interaction data transmitted from a customer/reader device. In some cases, the extracted insight and intelligence may be used for improving future documents personalization. For instance, a predictive model for assisting the assembly rules generation may be updated based on the extracted insight and intelligence.

The content creation and management system 121 may be configured to perform one or more operations consistent with those disclosed with respect to FIGS. 2-7. The content creation and management system 121 may be implemented anywhere within the platform, and/or outside of the platform 100. In some embodiments, the content creation and management system 121 may be implemented on the server 120. In other embodiments, a portion of the content creation and management system 121 may be implemented on the user device. Additionally, a portion of the content creation and management system 121 may be implemented on the third-party system. Alternatively or in addition to, a portion of the content creation and management system 121 may be implemented in one or more databases 111, 123. The content creation and management system 121 may be implemented using software, hardware, or a combination of software and hardware in one or more of the above-mentioned components within the platform. Details about the content creation and management system 121 are described later herein.

In some embodiments, a user (e.g., agent) 103-1, 103-2 may be associated with one or more user devices 101-1, 101-2, 101-3. A user may be an individual, an entity (e.g., business, company, organization, etc.), a group of individuals that may be authors or content creators who create the core materials, new documents or new components of the interactive content that can be further personalized. A user may be individuals such as personalizers (e.g., marketing managers, content managers, sales people, recruiters, marketers, etc.) who are customizing and personalizing the documents created by the authors in a pre-defined way. A user of the provided system or platform may also include individuals (e.g., analyzers) who may seek for and analyze the content performance analytics collected by the interactive content that is tailored to the customer, and administers who manage the various workflow (e.g., content creation, content personalization) and various functions of the platform.

User device 101-1, 101-2, 101-3 may be a computing device configured to perform one or more operations consistent with the disclosed embodiments. Examples of user devices may include, but are not limited to, mobile devices, smartphones/cellphones, wearable device (e.g., smartwatches), tablets, personal digital assistants (PDAs), laptop or notebook computers, desktop computers, media content players, television sets, video gaming station/system, virtual reality systems, augmented reality systems, microphones, or any electronic device capable of analyzing, receiving (e.g., receiving user input in one or more fields in a form, receiving definition of rules associated with a page, etc.), providing or displaying certain types of data (e.g., system generated personalization parameter options, original document, derivative document, etc.) to a user. The user device may be a handheld object. The user device may be portable. The user device may be carried by a human user. In some cases, the user device may be located remotely from a human user, and the user can control the user device using wireless and/or wired communications. The user device can be any electronic device with a display.

User device 101-1, 101-2, 101-3 may include one or more processors that are capable of executing non-transitory computer readable media that may provide instructions for one or more operations consistent with the disclosed embodiments. The user device may include one or more memory storage devices comprising non-transitory computer readable media including code, logic, or instructions for performing the one or more operations. The user device may include software applications provided by the content creation and management system 121 that allow the user device to communicate with and transfer data between server 120, the content creation and management system 121, and/or database 111.

The user device 101-1, 101-2, 101-3 may include a communication unit, which may permit the communications with one or more other components in the platform 100. In some instances, the communication unit may include a single communication module, or multiple communication modules. In some instances, the user device may be capable of interacting with one or more components in the platform 100 using a single communication link or multiple different types of communication links.

User device 101-1, 101-2, 101-3 may include a display. The display may be a screen. The display may or may not be a touchscreen. The display may be a light-emitting diode (LED) screen, OLED screen, liquid crystal display (LCD) screen, plasma screen, or any other type of screen. The display may be configured to show a user interface (UI) or a graphical user interface (GUI) rendered through an application (e.g., via an application programming interface (API) executed on the user device). The GUI may display, for example, an auto-populated form for customizing a selected document, a user interface for editing and defining a set of rules for a content item and user interface for creating content or interactive elements of a document (e.g., editable fields, videos, customer feedback survey, etc.). The user device may also be configured to display webpages and/or websites on the Internet. One or more of the webpages/web sites may be hosted by server 120 and/or rendered by the content creation and management system 121.

In some cases, users may utilize the user devices to interact with the content creation and management system 121 by way of one or more software applications (i.e., client software) running on and/or accessed by the user devices, wherein the user devices and the content creation and management system 121 may form a client-server relationship. For example, the user devices may run dedicated mobile applications or software applications for viewing personalization form or options provided by the content creation and management system 121. The software applications for creating a document or content, customizing a document, and for rendering and delivering the content may be different applications. Alternatively or in addition, the client application may comprise different modes for a user to customize/edit a selected document, to view analytics associated with customers, to create original content, respectively. The client applications for a content creator (e.g., author) and a content personalizer may be different applications.

In some cases, the client software (i.e., software applications installed on the user devices 101-1, 101-2, 101-3) may be available either as downloadable software or mobile applications for various types of computer devices. Alternatively, the client software can be implemented in a combination of one or more programming languages and markup languages for execution by various web browsers. For example, the client software can be executed in web browsers that support JavaScript and HTML rendering, such as Chrome, Mozilla Firefox, Internet Explorer, Safari, and any other compatible web browsers. The various embodiments of client software applications may be compiled for various devices, across multiple platforms, and may be optimized for their respective native platforms.

In some cases, the provided platform may generate one or more graphical user interfaces (GUIs) for the content personalizer interface. The GUIs may be rendered on a display screen on a user device (e.g., a personalizer's device). A GUI is a type of interface that allows users to interact with electronic devices through graphical icons and visual indicators such as secondary notation, as opposed to text-based interfaces, typed command labels or text navigation. The actions in a GUI are usually performed through direct manipulation of the graphical elements. In addition to computers, GUIs can be found in hand-held devices such as MP3 players, portable media players, gaming devices and smaller household, office and industry equipment. The GUIs may be provided in software, a software application, a mobile application, a web browser, or the like. The GUIs may be displayed on a user device (e.g., desktop computers, laptops or notebook computers, mobile devices (e.g., smart phones, cell phones, personal digital assistants (PDAs), and tablets), and wearable devices (e.g., smartwatches, etc.).

In some cases, third-party user interfaces or APIs may be integrated to the application and integrated in the front-end user interface (e.g., within the GUI). The third-party user interfaces may be hosted by a third-party server or entity 130. In some cases, APIs or third-party resources (e.g., customer CRM, customer analytics entity, social media, etc.) may be used to provide a content item to be included in a document, and/or reader analytics. In some cases, the platform 100 may utilize API requests to interact with various external assets (e.g., media source) to aggregate those content into the document.

User devices may be associated with one or more users. In some embodiments, a user may be associated with a unique user device. Alternatively, a user may be associated with a plurality of user devices. A user may be registered with the platform. In some cases, for a registered user, user profile data may be stored in a database (e.g., database 123) along with a user ID uniquely associated with the user. The user profile (e.g., personalizer profile) data may include, for example, user names, user ID, identity, business field, contact information, historical data, and various others as described elsewhere herein.

A server 120 may access and execute the content creation and management system 121 to perform one or more processes consistent with the disclosed embodiments. In certain configurations, the content creation and management system may be software stored in memory accessible by a server (e.g., in memory local to the server or remote memory accessible over a communication link, such as the network). Thus, in certain aspects, the content creation and management system(s) may be implemented as one or more computers, as software stored on a memory device accessible by the server, or a combination thereof. For example, one content creation and management system(s) may be a computer executing one or more algorithms for pre-training a predictive model, another content creation and management system may be software that, when executed by a server, processing the reader analytics data using the trained predictive model. As another example, one content creation and management system(s) may be a computer executing one or more algorithms for managing brand styles for rendering a customized document using a mapped brand style whereas another content creation and management system(s) may be a computer executing one or more algorithms for creating and/or personalizing a document.

The various functions performed by the client terminal and/or the content creation and management system such as content creation, generating ruleset for a content item (e.g., page), generating a personalization form, assembling a document with modular content items upon a personalization request, training a predictive model, executing a trained model, implementing pre-determined ruleset for generating personalized document and the like may be implemented in software, hardware, firmware, embedded hardware, stand-alone hardware, application specific-hardware, or any combination of these. The content creation and management system, and techniques described herein may be realized in digital electronic circuitry, integrated circuitry, specially designed ASICs (application specific integrated circuits), computer hardware, firmware, software, and/or combinations thereof. These systems, devices, and techniques may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, and/or device (such as magnetic discs, optical disks, memory, or Programmable Logic Devices (PLDs)) used to provide machine instructions and/or data to a programmable processor.

The third-party system 130 can be any entities that provides content services to be included into the personalized document via the platform 100. The third-party entity may provide services in a wide range such as customer CRM, external content assets (e.g., social media, online resource), public or private resources and various others. The third-party system 130 may be in communication with the content creation and management system via APIs such that the third-party content library, service information, brand style availability information and the like can be communicated. In some cases, reader analytics can also be provided to the third-party system upon a request.

In some cases, the server 120 may also be configured to store, search, retrieve, and/or analyze data and information stored in one or more of the databases. The data and information may include reader interaction data collected from the user/customer device as well as brand style data, mapping relationship for brand style management, content or document data, ruleset associated with a content item, data about a predictive model (e.g., parameters, model architecture, training dataset, performance metrics, threshold, etc.), data generated by a predictive model such as personalization options or extracted insight, reader feedback survey, and the like. While FIG. 1 illustrates the server as a single server, in some embodiments, multiple devices may implement the functionality associated with a server.

A server may include a web server, an enterprise server, or any other type of computer server, and can be computer programmed to accept requests (e.g., HTTP, or other protocols that can initiate data transmission) from a computing device (e.g., user device and/or meeting capturing device) and to serve the computing device with requested data. In addition, a server can be a broadcasting facility, such as free-to-air, cable, satellite, and other broadcasting facility, for distributing data. A server may also be a server in a data network (e.g., a cloud computing network).

A server may include known computing components, such as one or more processors, one or more memory devices storing software instructions executed by the processor(s), and data. A server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers.

Network 110 may be a network that is configured to provide communication between the various components illustrated in FIG. 1. The network may be implemented, in some embodiments, as one or more networks that connect devices and/or components in the network layout for allowing communication between them. For example, user device 101-1, 101-2, 101-3 third-party system 130, server 120, content creation and management system 121, and database 111, 123 may be in operable communication with one another over network 110. Direct communications may be provided between two or more of the above components. The direct communications may occur without requiring any intermediary device or network. Indirect communications may be provided between two or more of the above components. The indirect communications may occur with aid of one or more intermediary device or network. For instance, indirect communications may utilize a telecommunications network. Indirect communications may be performed with aid of one or more router, communication tower, satellite, or any other intermediary device or network. Examples of types of communications may include, but are not limited to: communications via the Internet, Local Area Networks (LANs), Wide Area Networks (WANs), Bluetooth, Near Field Communication (NFC) technologies, networks based on mobile data protocols such as General Packet Radio Services (GPRS), GSM, Enhanced Data GSM Environment (EDGE), 3G, 4G, 5G or Long Term Evolution (LTE) protocols, Infra-Red (IR) communication technologies, and/or Wi-Fi, and may be wireless, wired, or a combination thereof. In some embodiments, the network may be implemented using cell and/or pager networks, satellite, licensed radio, or a combination of licensed and unlicensed radio. The network may be wireless, wired, or a combination thereof.

User device 101-1, 101-2, 101-3, third-party system 130, server 120, or content creation and management system 121, may be connected or interconnected to one or more database 111, 123. The databases may be one or more memory devices configured to store data. Additionally, the databases may also, in some embodiments, be implemented as a computer system with a storage device. In one aspect, the databases may be used by components of the network layout to perform one or more operations consistent with the disclosed embodiments. One or more local databases, and cloud databases of the platform may utilize any suitable database techniques. For instance, structured query language (SQL) or "NoSQL" database may be utilized for storing the content or document data, ruleset data, brand styles, mapping relationships, customer/reader analytics data, historical data, predictive model, training datasets, or algorithms. Some of the databases may be implemented using various standard data-structures, such as an array, hash, (linked) list, struct, structured text file (e.g., XML), table, JavaScript Object Notation (JSON), NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. In some embodiments, the database may include a graph database that uses graph structures for semantic queries with nodes, edges and properties to represent and store data. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

In some embodiments, the platform 100 may construct the database for fast and efficient data retrieval, query and delivery. For example, the content creation and management system 121 may provide customized algorithms to extract, transform, and load (ETL) the data. In some embodiments, the content creation and management system 121 may construct the databases using proprietary database architecture or data structures to provide an efficient database model that is adapted to large scale databases, is easily scalable, is efficient in query and data retrieval, or has reduced memory requirements in comparison to using other data structures. The document or content items may be stored in a pre-defined structured data format that are described later herein.

In some embodiments, the one or more database systems 123, 111, which may be configured for storing or retrieving relevant data. Relevant data may comprise reader interaction data collected from the user/customer device, insight or intelligence extracted from the interaction data, brand style data for rendering the content, mapping relationship for brand style management, content or document data, ruleset associated with a content item, data about a predictive model (e.g., parameters, model architecture, training dataset, performance metrics, threshold, etc.), data generated by a predictive model such as personalization options or extracted insight, reader feedback survey, and various other data as described elsewhere herein. In some cases, the content creation and management system 121 may source data or otherwise communicate (e.g., via the one or more networks 110) with one or more external systems or data sources 111, such as one or more brand style database, media sources, analytics services, customer management services or databases. In some instances, the content creation and management system 121 may retrieve data from the database systems 111, 123 which are in communication with the one or more external systems (e.g., external media assets, etc.) or third-party systems 130 (e.g., third-party business entities, enterprise management software, customer management platforms, etc.).

In some cases, the database may store data related to machine learning-based models. For example, the database may store data about a trained personalized predictive model (e.g., parameters, hyper-parameters, model architecture, performance metrics, threshold, rules, etc.), data generated by a personalized predictive model (e.g., intermediary results, output of a model, latent features, input and output of a component of the model system, etc.), training datasets (e.g., labeled data, insight provided by expert, user feedback data, etc.), predictive models, algorithms, and the like. The database can store algorithms or ruleset utilized by one or more methods disclosed herein. For instance, pre-determined ruleset to be used in combination with machine learning trained models for generating a system-recommended assembly rules or personalized document may be stored in the database. In certain embodiments, one or more of the databases may be co-located with the server, may be co-located with one another on the network, or may be located separately from other devices. One of ordinary skill will recognize that the disclosed embodiments are not limited to the configuration and/or arrangement of the database(s).

In some cases, data stored in the databases or external databases can be utilized or accessed by a variety of applications through application programming interfaces (APIs). Access to the database may be authorized at per API level, per data level (e.g., type of data), per application level or according to other authorization policies.

Although particular computing devices are illustrated and networks described, it is to be appreciated and understood that other computing devices and networks can be utilized without departing from the spirit and scope of the embodiments described herein. In addition, one or more components of the network layout may be interconnected in a variety of ways, and may in some embodiments be directly connected to, co-located with, or remote from one another, as one of ordinary skill will appreciate.

Various aspects of the present disclosure may be applied to any of the particular applications set forth below or for any other types of applications or systems. Systems or methods of the present disclosure may be employed in a standalone manner, or as part of a package.

Figure 2:
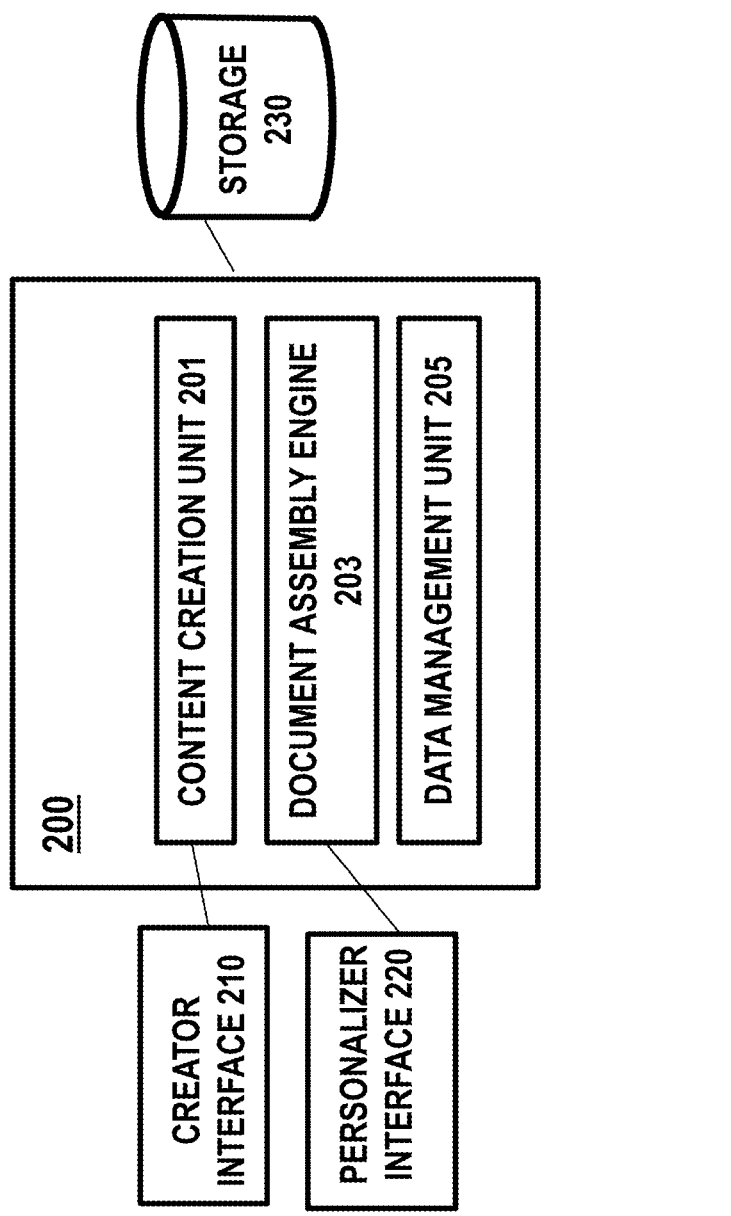
FIG. 2 schematically shows a diagram of a content creation and management system, in accordance with various embodiment of the present disclosure.

FIG. 2 schematically shows a diagram of a content creation and management system 200, in accordance with various embodiment of the present disclosure. In some embodiments, the system 200 may comprise a content creation unit 201, a document assembly engine 203, and a data management unit 205. The system may optionally comprise an author interface 210 and a personalizer interface 220. Alternatively, the author interface or personalizer interface may be a separate component that is operably coupled to the system 200. The content creation and management system 200 may be the same as the content creation and management system as described in FIG. 1.

In some embodiments, the content creation unit 201 may be configured to assist individuals such as authors in creating content or document. The content or document may be stored as structured data such as JavaScript object notation (JSON) data. In some embodiments, the content may be stored in a pre-defined document schema that contains the data and metadata needed to render each document. For example, the pre-define document schema may beneficially store a content item (e.g., pages, slides) of a document in a modular fashion. The document or content may be created and stored in a database that may be implemented using various standard data-structures, such as an array, hash, (linked) list, struct, structured text file (e.g., XML), table, JSON, NOSQL and/or the like.

A content item such as a page, a slide, a video, an image, a chart, a text file of a document may be stored with one or more different representations (e.g., mobile rendering, desktop rendering, rendering in a browser, rendering in a desktop application, etc.). This may beneficially allow a content item or document being selected to be assembled with other content items to form a derivative document and the derivative document is rendered in the one or more different representations upon a request.

In some cases, a content item or a document may be stored in the structured data format with a set of rules to control how it is displayed. The set of rules may include, for example, Page Types and other Types, theme brand, styles and various others for determining how the content item is presented. For example, a Page Type A may define displaying a blue box on the right-hand side of the page with white text. One or more content items (e.g., pages) created by the system may be mapped to one or more brand themes or Page Types for rendering the content. In some embodiments of the system, the content may be stored in a content database and the theme or style branding information may be stored in a separate database, and a mapping relationship may be established to connect a content with one or more brand styles.

A style or theme branding of a given document or a set of documents can be changed or updated on the fly. For example, a set of documents are mapped to a brand, and upon a brand change, a mapping from the previous brand to a new brand may be established, and the new brand may be propagated through the set of documents instantly. In some cases, the mapping relationship may also define that when a brand is not available, the next brand should be used for displaying the content item. For instance, a mapping relationship may define that a content item is displayed using Page Type A and when Page Type A does not exist, the content item will be displayed using Page Type B, C or D under certain conditions.

In some cases, the content creation unit 201 may include a mapping engine that may be called at runtime for rendering the content using the current mapped brand style and/or using a presentation format selected based on the rendering environment. In some instances, after selection of a content item to be assembled to a personalized document, a mapping engine is called to retrieve the mapped brand theme or style for rendering the content item.

A content item such as a page, a slide, a video, an image, a chart, a text file of a document may be associated with one or more assembly rules. The one or more assembly rules may define criteria for selecting a content item or displaying a content item. The one or more assembly rules may be related to various aspects for selecting a content item for display such as subject matter, financial data, performance data, geographic origin, identity of owner, identity of creator, and/or other information associated with the content (e.g., document size) or the use application (e.g., customer segment). The one or more assembly rules may be stored with the content item (e.g., page) in the structured data. Alternatively or in addition to, a rule ID may be stored with content that maps the content item to a set of rules stored in a ruleset data object (e.g., table).

Figure 3:
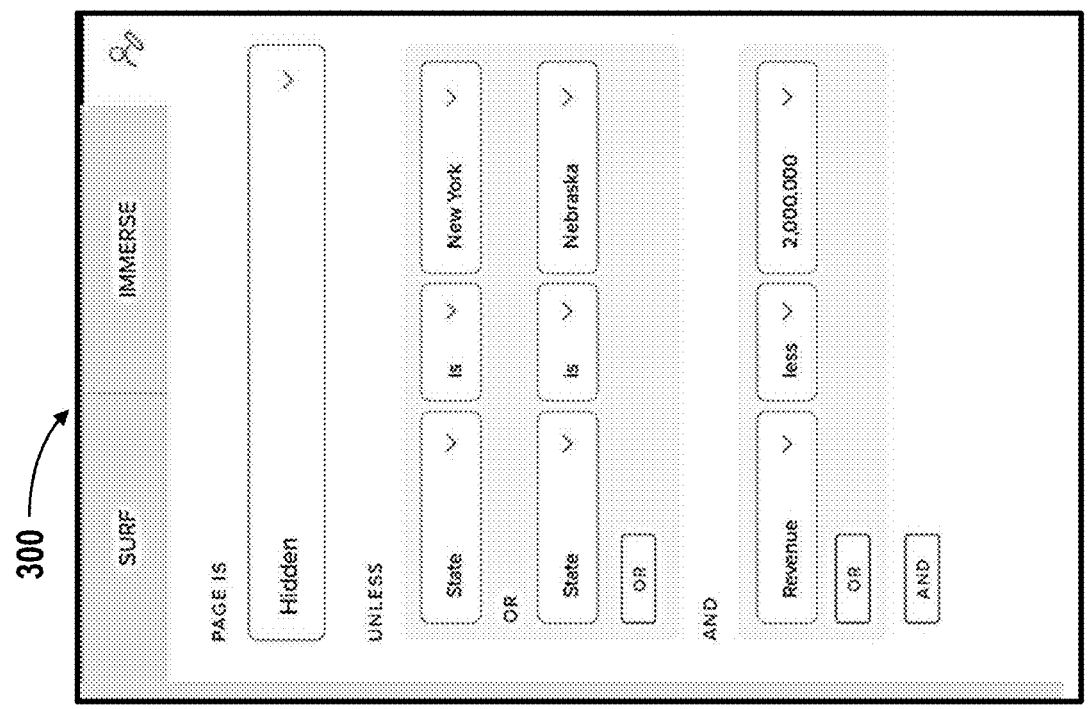
FIG. 3 shows an example of a user interface (e.g., creator interface) for defining a set of assembly rules for a page of a document.

The assembly rules can be defined by a user (e.g., author, creator) via a user interface. FIG. 3 shows an example of a user interface (e.g., creator interface) 300 for defining the assembly rules for a page of a document. A content creator may define the rules for hiding (e.g., not selecting) or displaying (e.g., selecting) a page. As illustrated in FIG. 3, the rules may specify a set of conditions such as geographical location (e.g., state), and revenue to meet in order to display/select the respective page.

The user interface 300 may permit a user to edit the set of rules by adding, deleting a rule, modifying the value of a rule, and/or logical relationships between rules. For instance, a user may add a new rule and specify the logical relationship among the multiple rules via the user interface. For example, a user may be provided with logical relationship options (e.g., AND, OR) in the user interface 300 to select for adding a rule. A user may be allowed to define a rule with options (e.g., state) provided by the system. Alternatively or in addition to, the user interface 300 may allow a user to define rules in addition to the system provided options. For example, a user may be allowed to define a rule by a direct input in a text field (e.g., revenue range).

The logical relationship options, rule options and values can be provided in any suitable manner such that a user may set the assembly rules by interacting with the user interface. For example, the rule options can be provided via a menu (e.g., dropdown menu), via a text field (e.g., direct text input), via selectable table and other user interface features. In some cases, upon receiving the user input indicative of an update of the assembly rules, the rules may be automatically updated in the data structure of the associated content item (e.g., slide, page).

Figure 12:
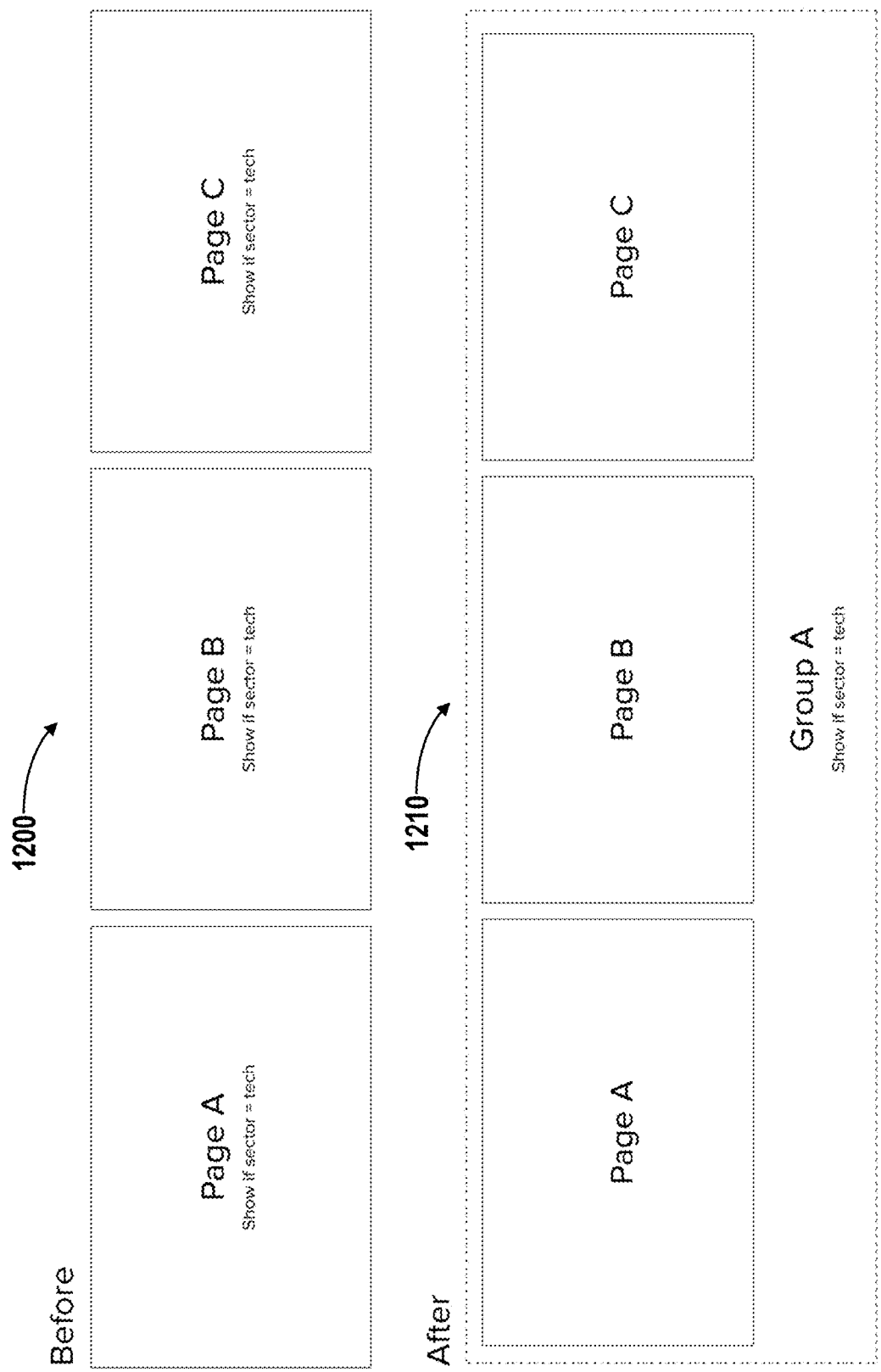
FIG. 12 shows an example of managing assembly rules for a group of content items.

In some cases, the system may allow users to set up the assembly rules in a batch fashion. For example, as shown in FIG. 12, when the page rules for Pages A, B and C are identical (Show if sector=tech), instead of setting up the rule for each page individually 1200, a user may group the multiple pages as shown in 1210 and manage the rules for the group (e.g., setting a single rule for the group which is applied to all the pages in the group). This beneficially improves the efficiency for managing/setting assembly rules.

Alternatively or in addition to, the assembly rules may be automatically provided or updated by the system using a machine learning algorithm trained model. In some cases, the rule options may be automatically generated based on historical data for user to select. In some cases, an assembly rule may be automatically updated based on the collected analytics without user interaction. The machine learning algorithm can be any type of machine learning network such as a neural network. Examples of neural networks include a deep neural network, a convolutional neural network (CNN), and a recurrent neural network (RNN). The machine learning algorithm may comprise one or more of the following: a support vector machine (SVM), a naive Bayes classification, a linear regression model, a quantile regression model, a logistic regression model, a random forest, a neural network, CNN, RNN, a gradient-boosted classifier or repressor, or another supervised or unsupervised machine learning algorithm (e.g., generative adversarial network (GAN), Cycle-GAN, etc.).

In some cases, the content creation unit 201 also allows users to personalize a content item (e.g., pages, slides). For example, a user may add a customer name, changing a logo, hiding a block within a page. In some cases, the pages can be customized on the fly automatically according to the information provided by the seller, so that the buyer's name, logo and website homepage, custom value propositions and the like are included at various places in the document.

In some cases, the input information may automatically trigger the updates such as via a third-party (e.g., customer) application programming interface (API). APIs or third-party resources (e.g., customer CRM, customer analytics entity, social media, etc.) may provide input information to update or customize a content item in a document. In some cases, the platform may utilize API requests to interact with various external assets (e.g., media source) to aggregate those content into the document.

Figure 8:
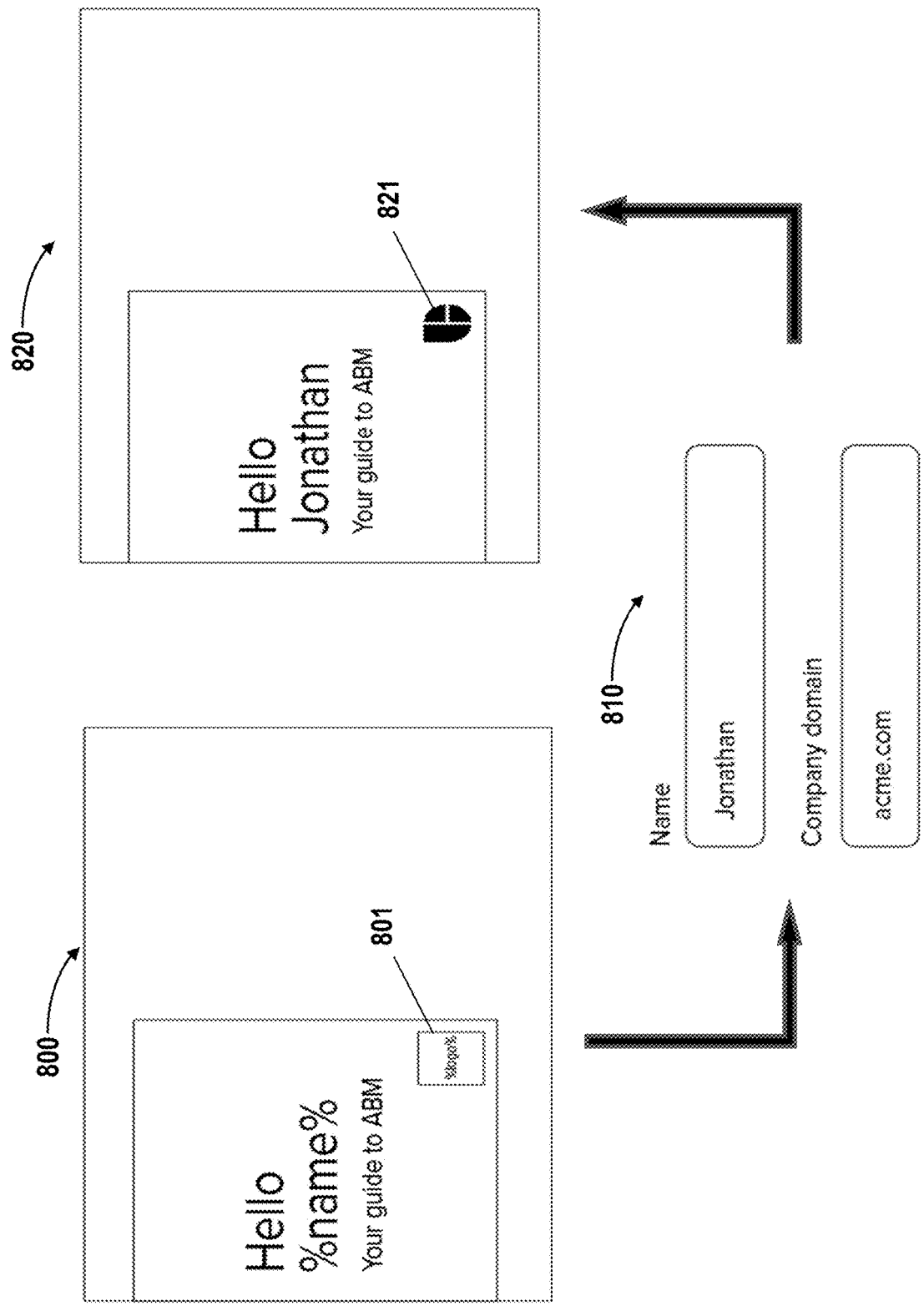
FIG. 8 shows an example of customizing a page via API.

FIG. 8 shows an example of customizing a page via API. In the illustrated example, a user may modify or customize a base page 800 via the user interface of the content creation unit. A user may modify any customizable element within a page. For example, the base page 800 may include one or more customizable elements—a % name % field and a % logo % field. In some cases, a user may modify a selected customizable element by providing user input (e.g., values) on the user interface 810. For example, the user may directly input values for the customizable elements "Name" field and "Company domain" in the form 810. Alternatively or additionally, the input information (e.g., values) may be provided automatically by a third-party system or database via the API connection. For example, the name or the company domain may be automatically obtained from a third-party source (e.g., content library, customer CRM, customer analytics entity, social media, etc.) via the API connection. Upon receiving the input information, the content creation unit may automatically populate the output page 820 based on the input values, creating a personalized version of the page which can now be sent/displayed to the user.

Figure 9:
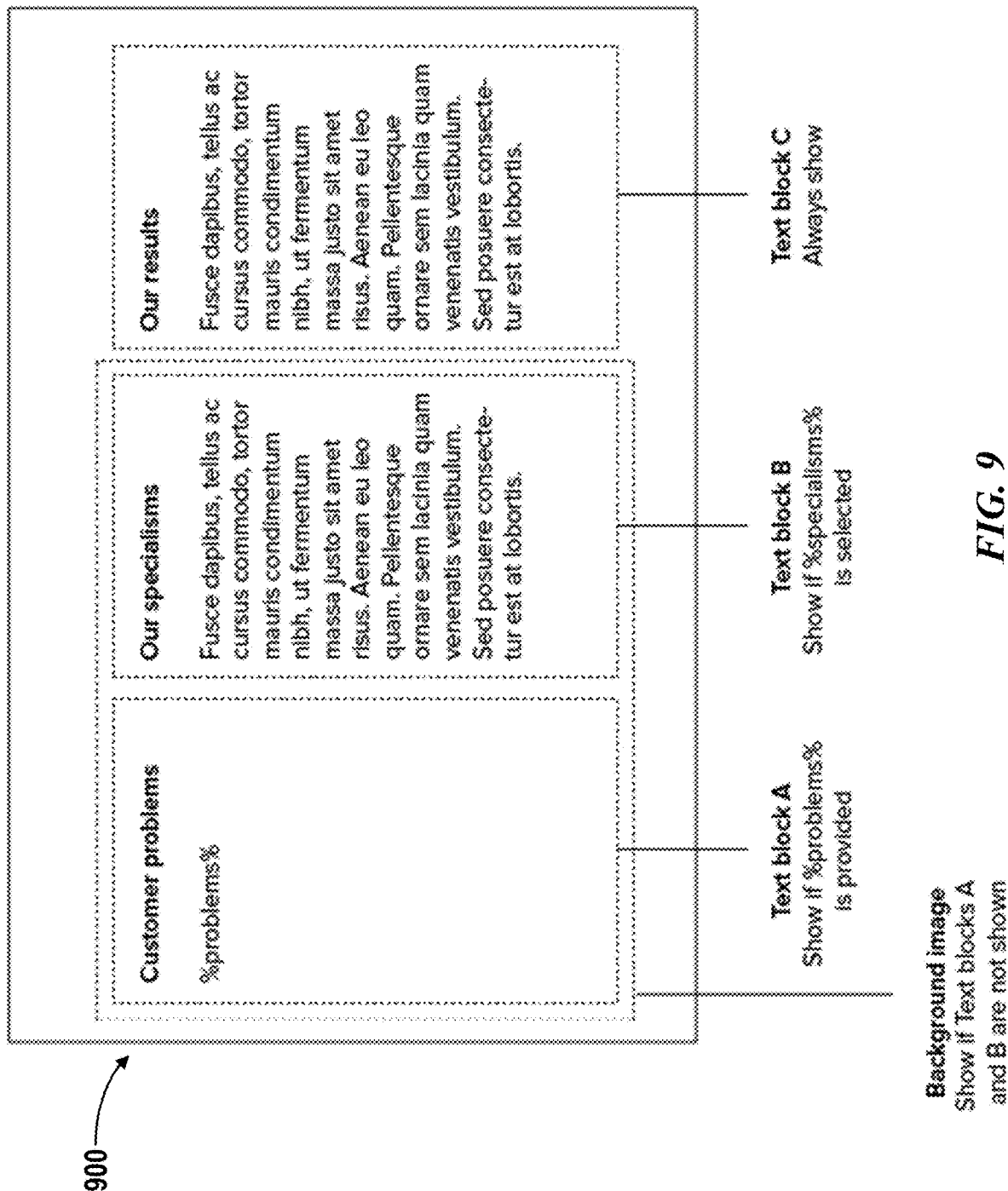
FIGS. 9-11 shows an example of customizing a content item.
Figure 10:
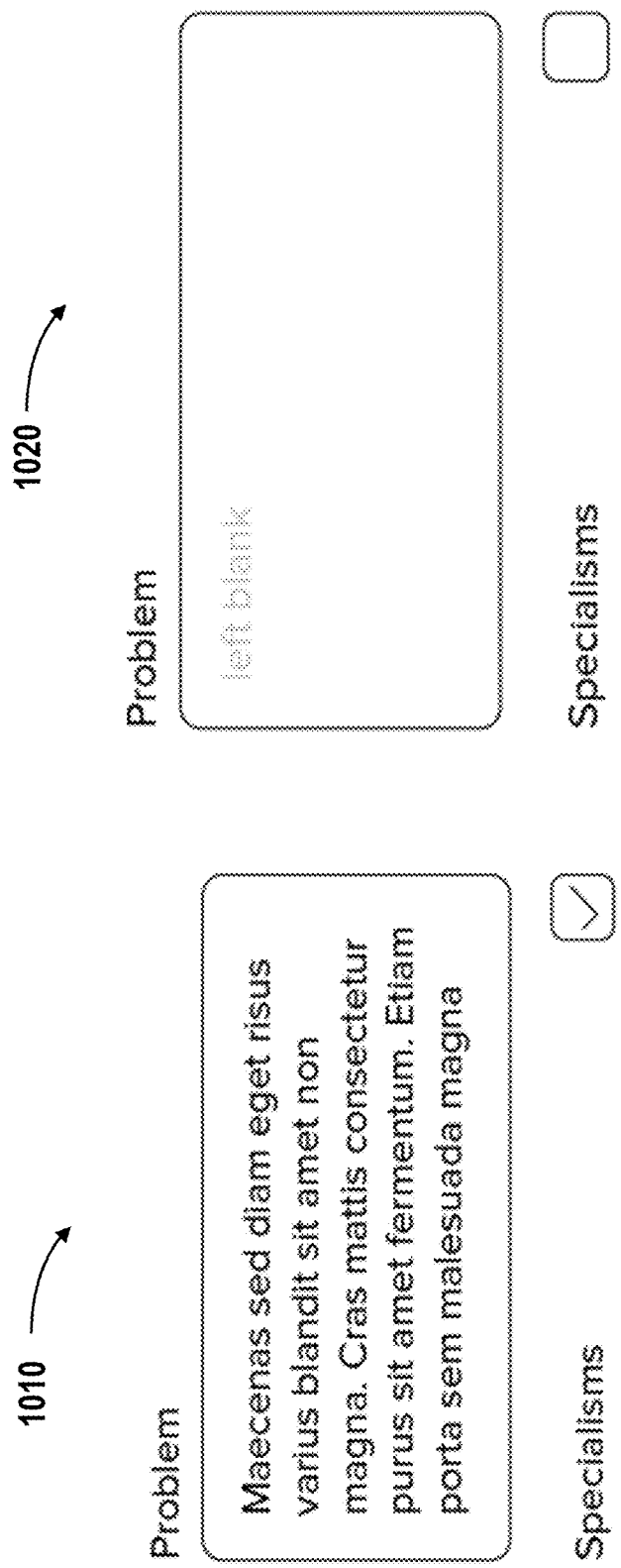
Figure 11:
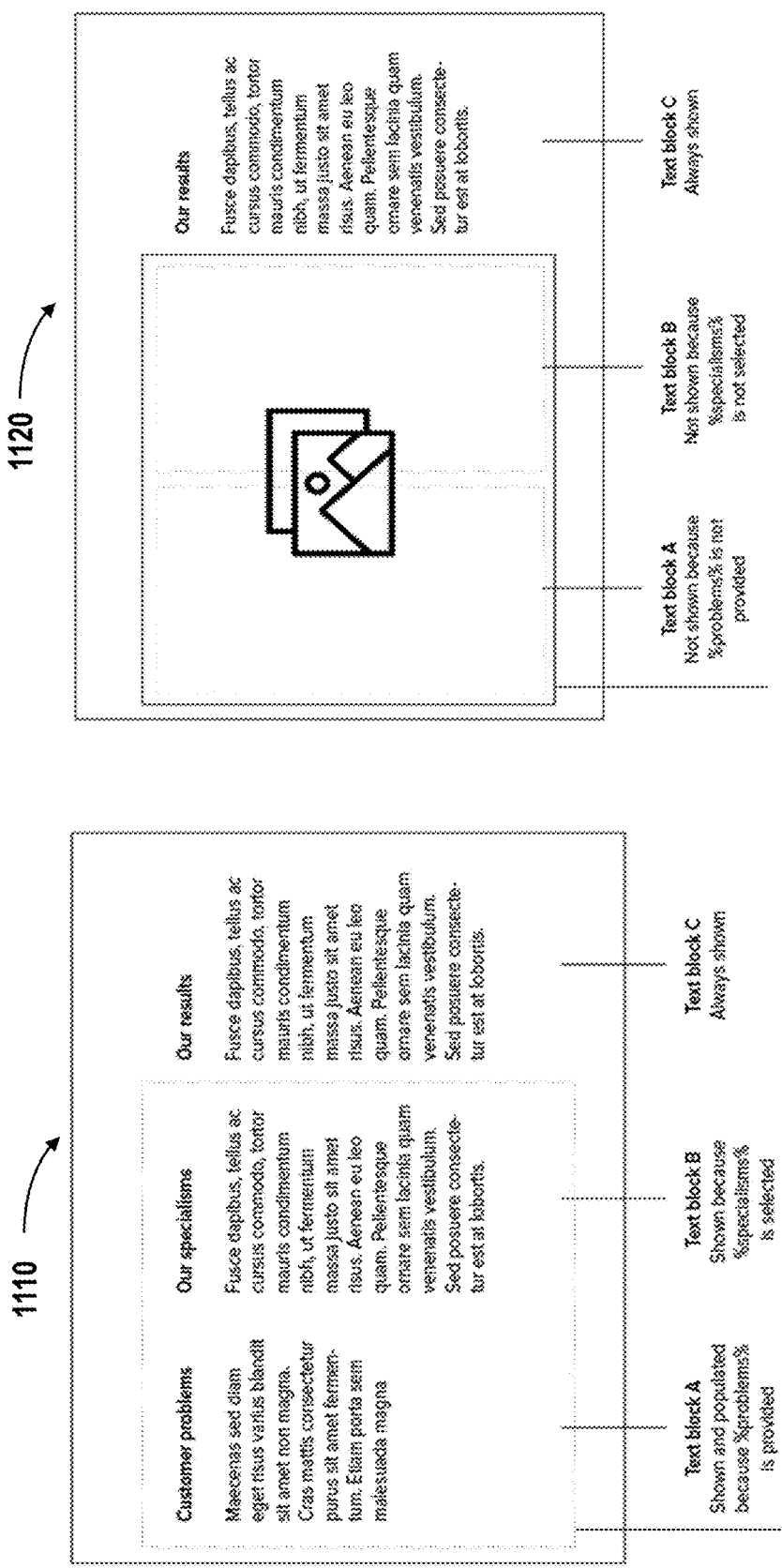

In some embodiments, in addition to modifying a customizable element within a page, the content creation unit may allow users to include or exclude blocks of content within a page. This beneficially allows users to customize the display or appearance of an element. FIGS. 9-11 shows another example of customizing a content item. In the example illustrated in FIG. 9, the base page 900 may comprise one or more elements with display/appearance parameters. The display or appearance parameters, for example, "show and populated if a % problems % value is provided" for Text Block A, may be pre-determined for the base page. In some cases, the display/appearance parameters may be set up by a user of the content creation and management system. In some cases, the display/appearance parameters may define the display of a single element or interaction between the display of multiple elements. In the illustrated example, the display or appearance parameters for Text Block B is "show if % specialisms % is selected," for Text Block C is "always be shown" and for Background Image is "show if Text Blocks A and B are not shown."

In the first example 1010 illustrated in FIG. 10, when a user provides a value for Text Box A (e.g., providing a value for % problems %) and selects "specialism" (e.g., ticks % specialisms %) via the user interface (e.g., form), the output page 1110 may be populated and may show Text Block A, Text Blocks B and C, and not show Background Image (shown in FIG. 11). In the second example 1020 illustrated in FIG. 10, when a user does not provide a value for % problems % and not select % specialisms %, the output page 1120 may be populated as shown in FIG. 11. The output page 1120 may hide Text Blocks A and B, and may show the Background Image. In this scenario, the Background Image automatically fills the blank space and completes the layout when Text Blocks A and B are hidden. This beneficially provides automatic layouts design at the page level that can automatically adapt to complex layout requirement.

Referring back to FIG. 2, the document assembly engine 203 may be configured to select the documents stored in the content database 230. The document assembly engine may comprise a selection module configured to select modular content items from one or more different documents to generate a derivative document. In some cases, the content items may be selected in response to a personalization request that includes information about one or more aspects of the desired document/content. For instance, the information may be related to the expected customer segmentation/reader of the document, size of the document, location, business purpose, field, filetype and various others. Upon receiving the personalization request, the relevant content items may be automatically selected across multiple documents stored in the content database based on the assembly rules associated with each content items (e.g., subject matter, financial data, performance data, geographic origin, identity of owner, identity of creator, document size, etc.) and generate a new personalized document or derivative document.

Figure 4:
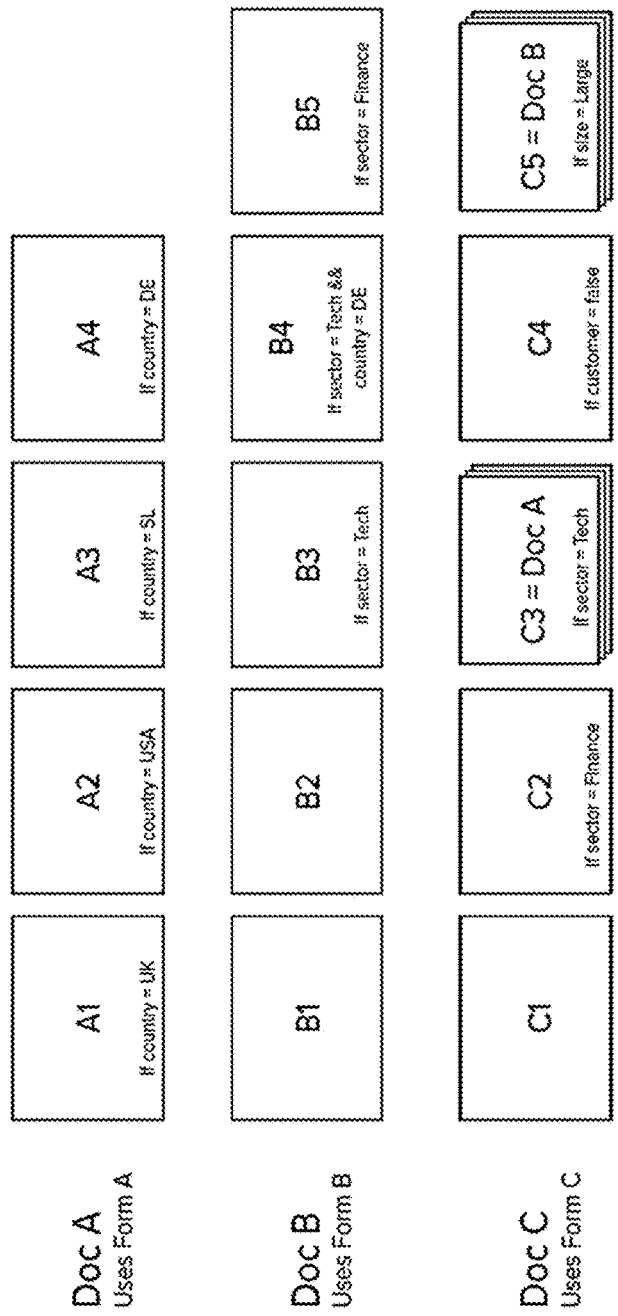
FIG. 4 illustrates examples of multiple documents that each document including at least one document page embedded with one or more assembly rules.
Figure 5:
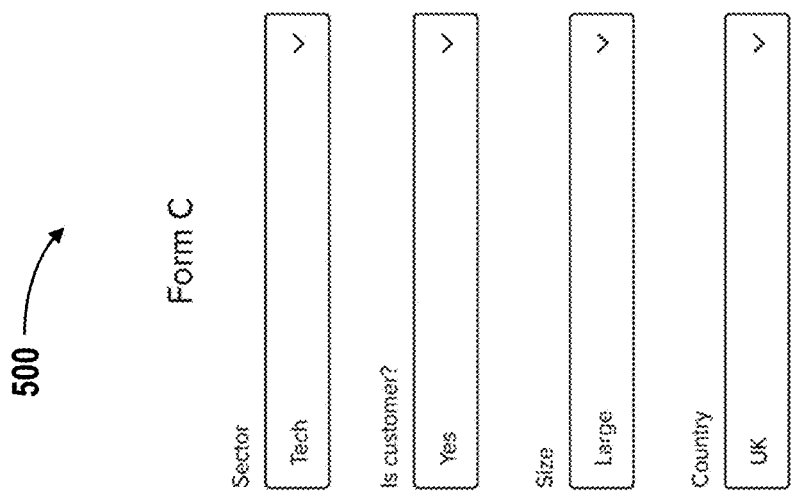
FIG. 5 shows an example of a user interface for personalizing a selected document, in accordance with some embodiments of the present disclosure.
Figure 6:
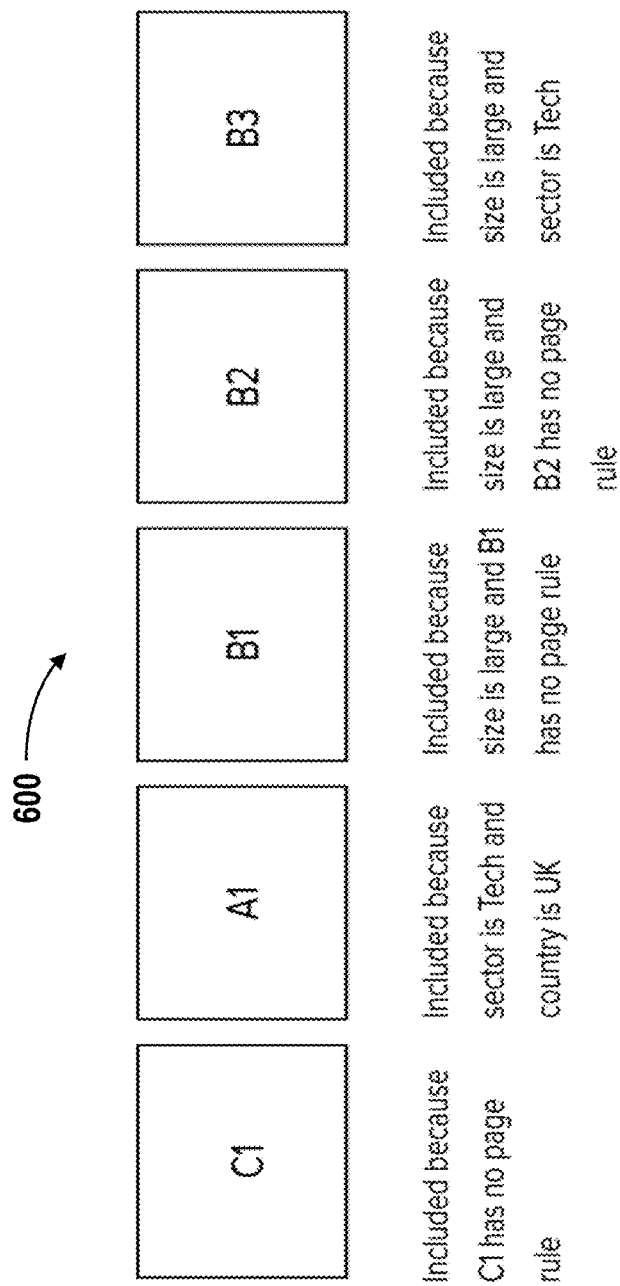
FIG. 6 shows an exemplary document assembly.

FIGS. 4-6 show an example of assembling a document upon a personalization request. As illustrated in FIG. 4, documents A, B, C may each include a plurality of content items such as document pages A1, A2, A3, A4 for document A, document pages B1, B2, B3, B4, B5 contained in document B and documents pages C1, C2, C3, C4, C5 contained in document C. In some cases, at least one content item of a document may be associated with assembly rules as described above. For instance, page A1 has embedded rule 'if country=UK' that when the condition is met (i.e., the personalization request indicates country=UK) page A1 will be selected or displayed. It should be noted that the example is for illustration purpose only. For example, a ruleset can be associated with a content item via a mapping relationship (e.g., specified by rule ID and content ID) or be directly stored with the content data structure.

In some cases, a content item can be linked with another content items from the same or other documents. In some cases, a content item can be linked to another document. For example, document page C3 is an embedded version of document A and page C5 is an embedded version of document B. In such case, document page C3 or C5 may be automatically updated when a change/update is made to respective document A or document B. As an example, document A may be a bank of case studies that may be automatically inserted into document C (when the assembly condition is met) that may be a report, proposal or pitch document. Upon determining the assembly rule of page C3 is met (e.g., sector=Tech), the document pages in document A may be inserted as page C3 and displayed in document C. In some cases, all of the pages of document A are displayed as page C3. Alternatively, a subset of pages of document A may be displayed according to the assembly rules associated with the pages in document A.

In some cases, the document A, B and C may be referred to as master document or source document and the assembled document such as shown in FIG. 6 may be referred to as derivative document or personalized document. A master document may have assembly rules embedded with the document. Upon creation of the derivative document, the personalization parameters (e.g., fields in the personalization form) that were provided during the personalization process and a reference to the source document may be stored in the system as a link or connection to the source document(s). Every time when the personalized document is requested or accessed by a reader, the source document may be loaded and the stored link may be used to dynamically apply changes from the source documents. This beneficially allows updating the derivative documents on the fly.

Figure 16:
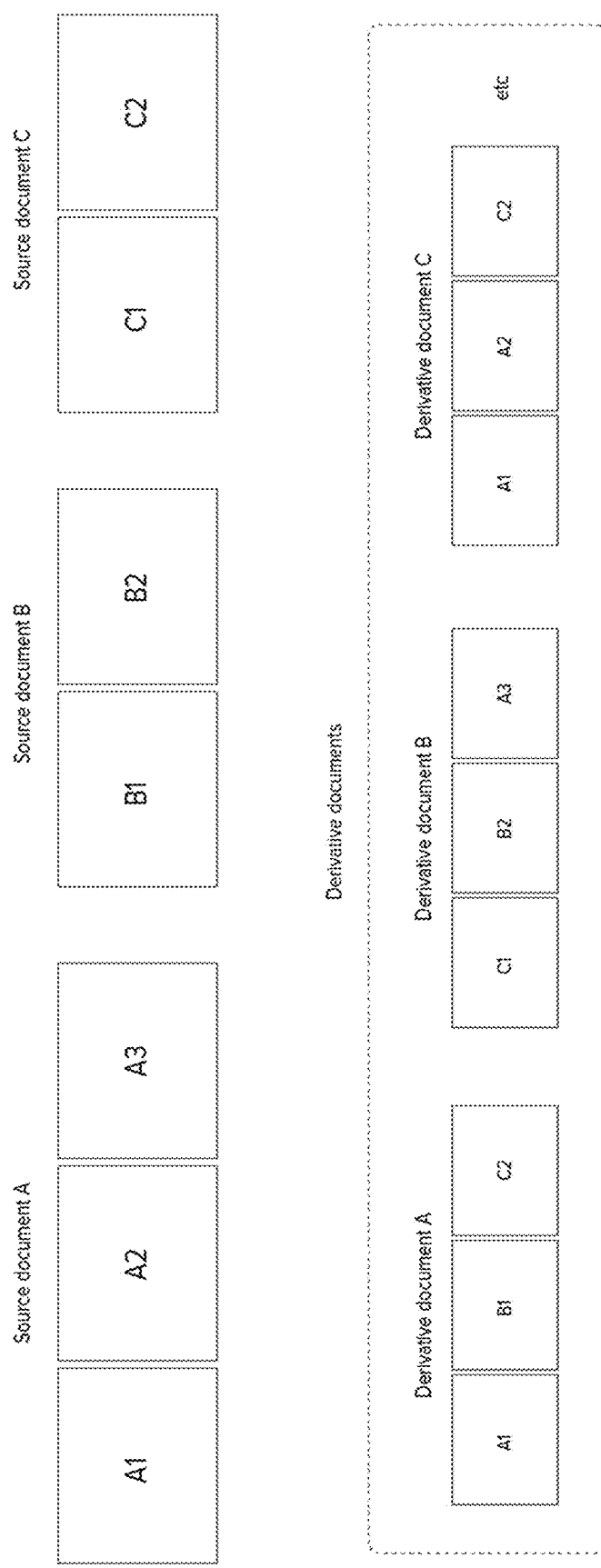
FIG. 16 and FIG. 17 show an example of a source documents and the effect on the derivative documents.
Figure 17:
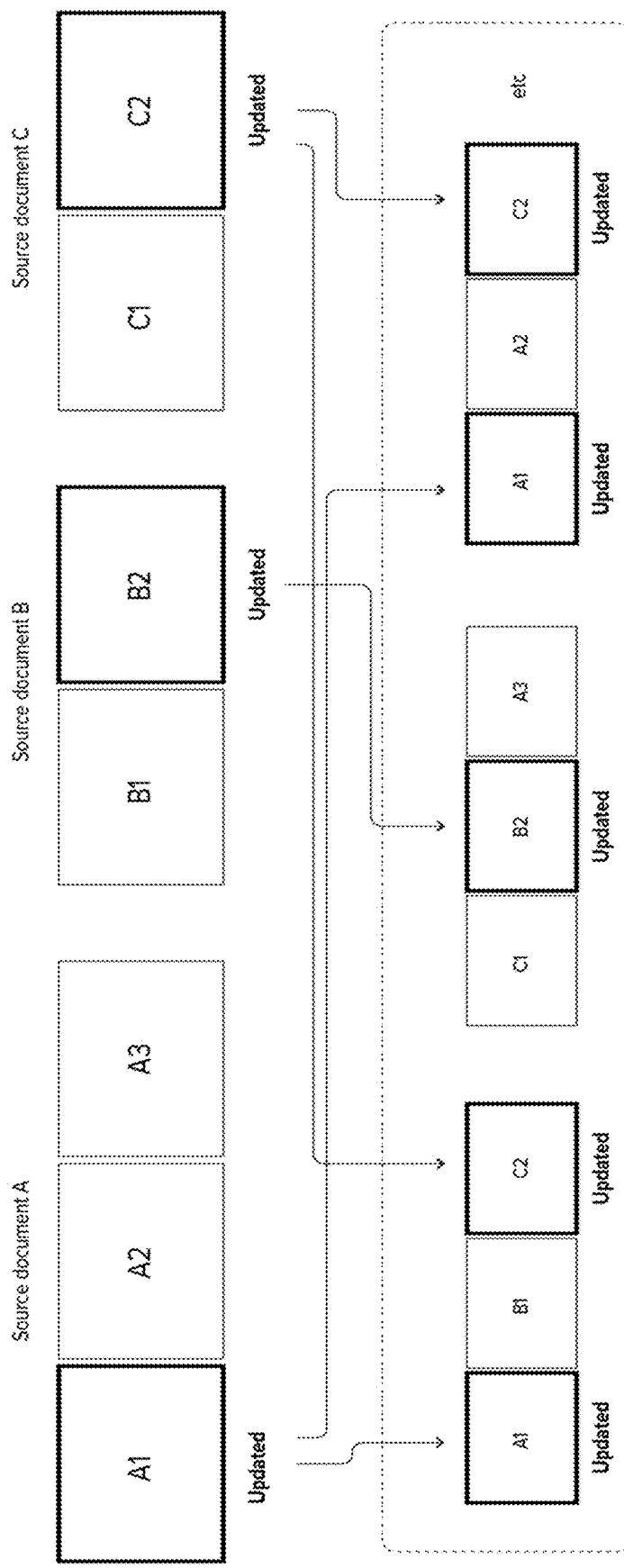

FIG. 16 and FIG. 17 show an example of updating the source documents and the effect on the derivative documents. The updates from the source documents may be automatically applied to the derivative documents via the stored connection. A reader can access the updated document such as a browser directly.

Figure 18:
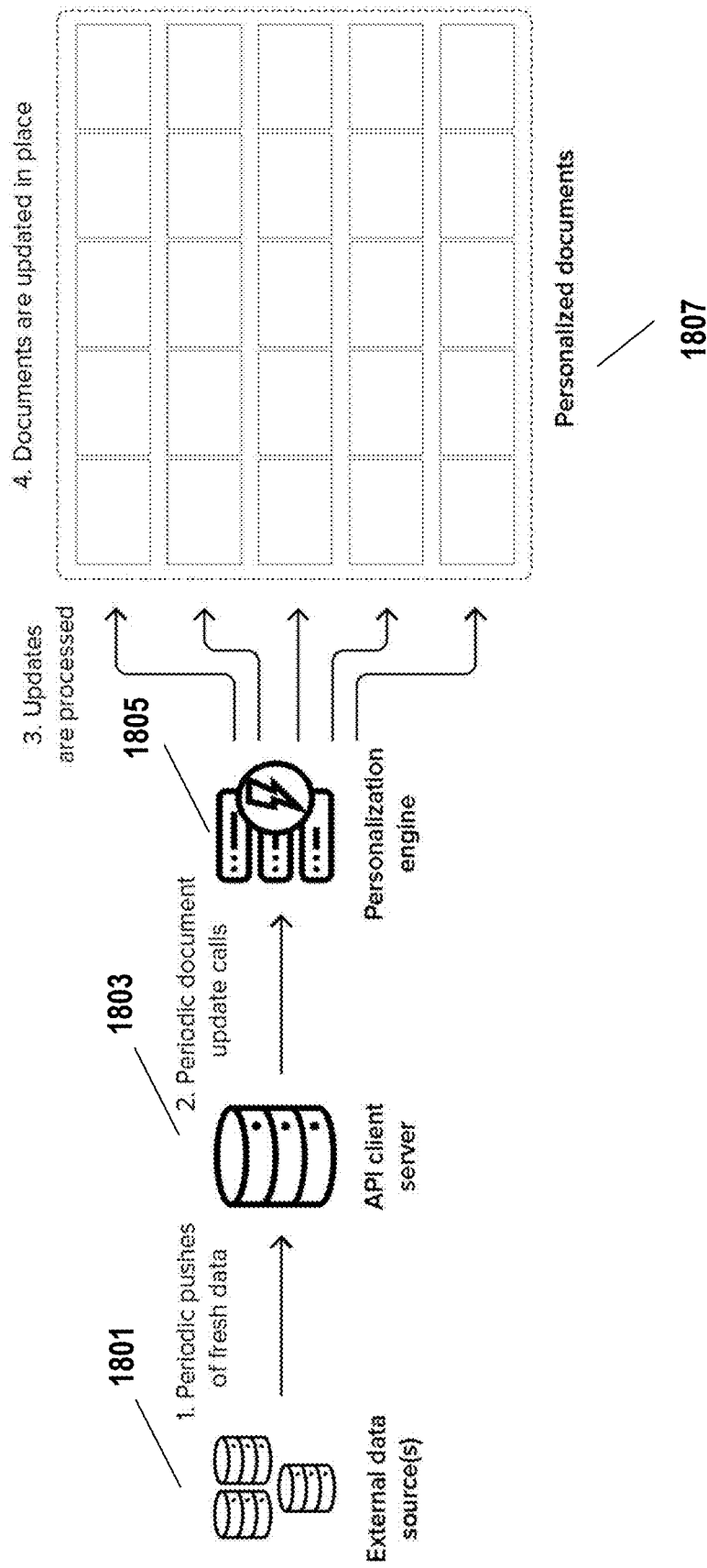
FIGS. 18-20 shows an example of updating a personalized document on the fly based on information from external data sources.
Figure 19:
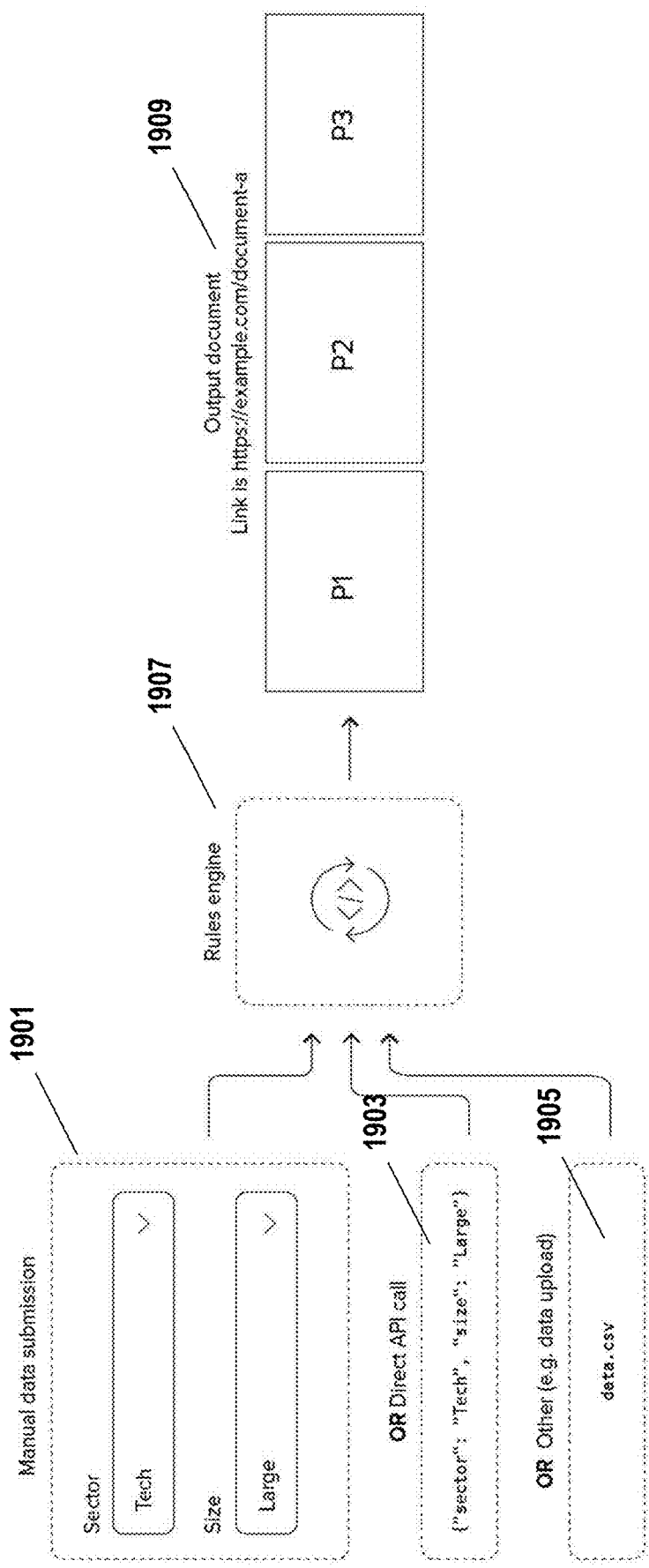
Figure 20:
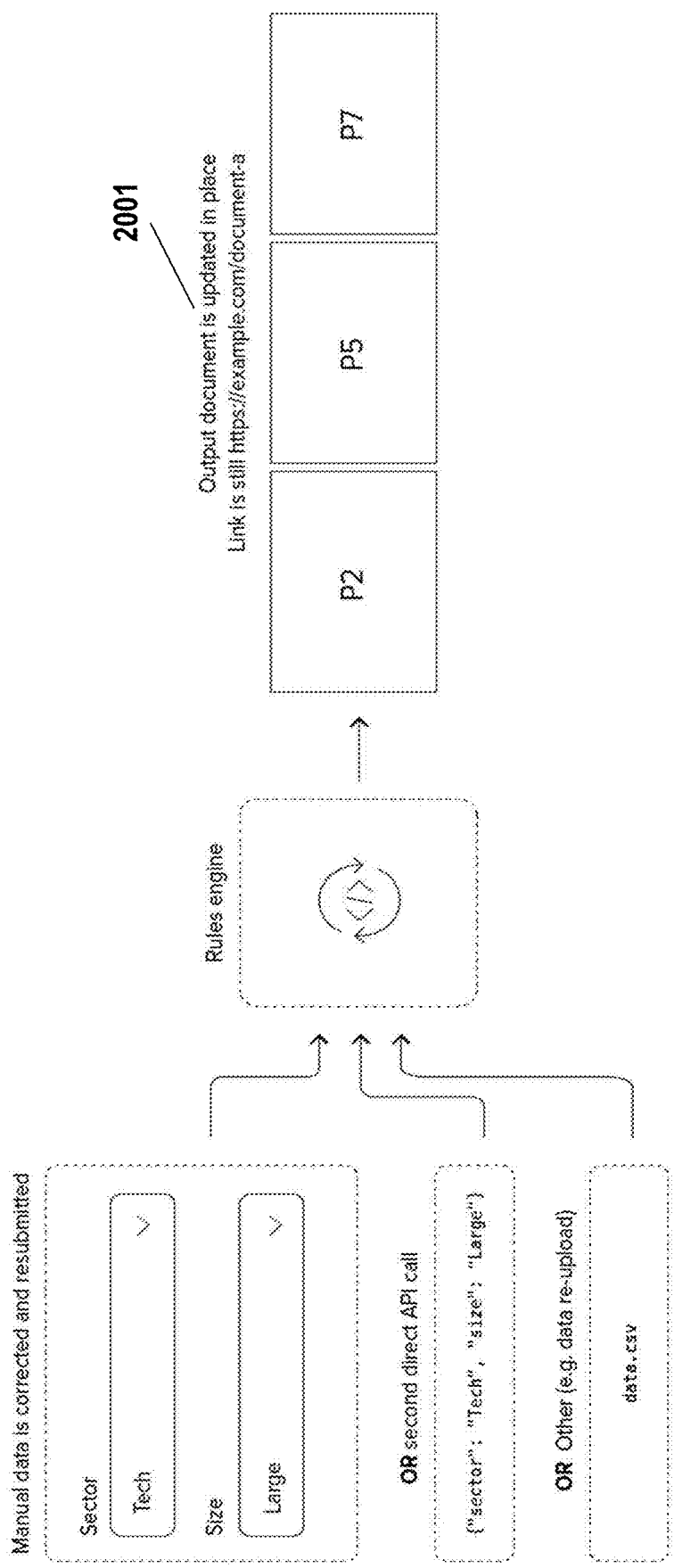

The personalized document can be updated based on the personalization parameters (via the personalization form), batch uploaded data (e.g., .csv file), third-party information (e.g., via API), a combination of any of the above, and/or others as described elsewhere herein. FIGS. 18-20 shows an example of updating the personalized document on the fly based on information from external data sources. FIG. 18 schematically shows updating personalized documents by making API calls. For example, a user in financial sector may have personalized documents 1807 each of which is about a specific stock (e.g. current share price, percentage change etc.). Such personalized documents may be automatically updated daily (or upon changes) based on the information (e.g., new price, percentage change and the like) from a third party software (e.g., stock tracker software) or external data sources 1801 by making an API call 1803 to the system (e.g., personalization engine 1805) to update the relevant information across the personalized documents.

As shown in FIG. 19, the personalized document can be updated based on the personalization input data including personalization parameters (via the personalization form) 1901, batch uploaded data (e.g., .csv file) 1905, and third-party information (e.g., via API) 1903 or other suitable input data. The assembly engine or rules engine 1907 may generate the personalized document 1909 as described elsewhere herein. Whenever there is an update in the input data (e.g., a field update in the personalization form, external data sources, new uploaded data.csv), the personalized document 2001 may be updated automatically as shown in FIG. 20.

In some cases, the system may be capable of converting a personalized document into a master document. The system may break the connection between the personalized document and its original master document such that updates to the original master document may not affect the personalized document whereas the converted personalized document can be fully customized and used for creating further derivative versions or documents. During conversion, the system may run the personalization fields through the assembly engine and store the personalization fields in the database as assembly rules associated with a new master document. The stored fields from the personalization step may be "hardcoded" into the new master document as assembly rules (e.g., embedded with the master document) which can then be edited and personalized in a manner similar to other master documents.

In some embodiments, the system may allow users to personalize the document based on live rules. The live rules may be based on live information. For example, the live rules may define the personalized document to be assembled or personalized based on the weather at the reader's location, time of day and the like.

The personalization request may be provided by a user (e.g., personalizer) who are personalizing or customizing a document. In some cases, the document assembly engine may provide a user interface (e.g., personalizer interface) for a user to provide input about personalization a selected document. FIG. 5 shows an example of a user interface for personalizing a selected document.

In some cases, the user interface (e.g., personalizer interface) may automatically populate one or more fields corresponding to one or more personalization parameters for a user to personalize a selected document (e.g., document C). As shown in the example, a form 500 may be automatically populated with one or more parameters fields. The personalization parameter field may be auto-populated based on the assembly rules associated with the content items of document C. The assembly rules may be used to identify parameters fields that require user input. For instance, the one or more parameter fields may include 'sector' embedded in page C2 and C3, 'if customer' embedded in page C4 and 'size' embedded in page C5. In the case when a page of the document is linked to another document/page, a composite parameter field based on the rule (e.g., country) associated with the linked document or page (e.g., document A) may also be provided on the user interface.

A user may specify a value from a set of options for one or more of the parameter fields for personalizing the selected document. The personalization options can be provided in any suitable manner such as via a menu (e.g., dropdown menu), via a text field (e.g., direct text input), a text area including multiple text fields, a checkbox (e.g., list of tick-box options), via selectable table and other user interface features.

In some cases, a personalization form may be associated with one or more master documents or starting documents. For example, different industries may have different master documents. In some cases, upon a user selecting an industry to begin with, the corresponding personalization form may be displayed for the user to fill in the fields.

In some cases, at least a portion of the parameters or all of the parameters may be automatically determined without user intervention or user input. For example, at least a portion of the fields may be automatically filled via an API connection to the customer's CRM. Such connection may be established that permits the form to be completed using data retrieved from the relevant sources (e.g., third-party database, CRM) in response to a personalization request. For example, a personalizer may only need to specify the relevant contact record from their CRM and the form may be auto-populated based on the information retrieved from the CRM. In some cases, the information inputted by a user for various purposes may be processed and used to automatically filled-in a field. For example, user's single-sign on information (e.g., email address) may be processed to extract the domain, and the domain information may be used to identify an organization associated with the user, then automatically fill in the organization field in the form.

In some cases, one or more values in the fields may be automatically calculated/updated based on the values of other fields. For instance, one or more fields may be expression field that has a value calculated based on a pre-defined relationship with another field. For example, a field A may be "price" field, field B is "taxPct" field, field C is "total," and value of field C may be calculated based on the pre-defined relationship: fieldC=fieldA+fieldB/100. In some cases, such relationship may be defined using the expression: "$: fields.price * (1+fields.tax Pct/100). In addition to defining relationship between multiple fields, properties such as facts about an item in the system may also be defined using the expression such that a field can be updated automatically. For example, the expression of user's email address or email domain may be "$: ctx.user.email" or "$: ctx.user.email.split['@'][1]" and such expression may allow the form to grab the email information from the third-party system via the API as described above.

In the illustrated example, upon receiving a user input indicating the personalization parameters, a resultant personalized document may be assembled by pulling the content items that meet the personalization parameters from one or more documents. As shown in FIG. 6, the personalized document 600 may be automatically generated by pulling C1 from document C (C1 has no page rule), page A1 from document A (country=UK and sector=Tech), pages B1 from document B (size=large and B1 has no page rule), page B2 from document B (e.g., size=large and B2 has no page rule) and page B3 from document B (size=large and sector=Tech). In the illustrated example, when an assembly rule is not defined for a given content item, the content item may be set to meet any personalization parameters and be displayed by default. It is noted that the default display or hidden for a content item when there is no rule is defined can be set up by a user (e.g., author or administer) of the system.

In some embodiments, the system may allow users to set access permissions on the document. For example, a user may set the access permission to allow people with a specific email domain to access a document. In some cases, the access permission can be set up in the personalization form. For example, a user may provide the email domain in the personalization form to give access permission to other users with the email domain.

In some embodiments, the system may also allow users to batch upload files thereby improving the efficiency to assemble a large number of documents. In some cases, a user may upload a file containing personalization parameters and values for multiple documents. The file can be in any format that is suitable for exchanging text data. For example, a user may upload a .csv (Comma Separated Values) file which contains rows and columns. Each column may have a heading and relate to a given field from the personalization form, and each row entry may include the required data/value for the corresponding field. Upon uploading the text file, the system may extract the values for the corresponding parameters and generate the assembly rules accordingly. In some cases, the resulting assembled documents may be delivered to the user in the form of .csv (containing URLs for the assembled documents). This batch processing capability beneficially allows users to personalize multiple documents without manually filling the individual forms. In some cases, the text file may also be used to upload complex information (e.g. a pricing table) which can be part of a form submission.

Figure 13:
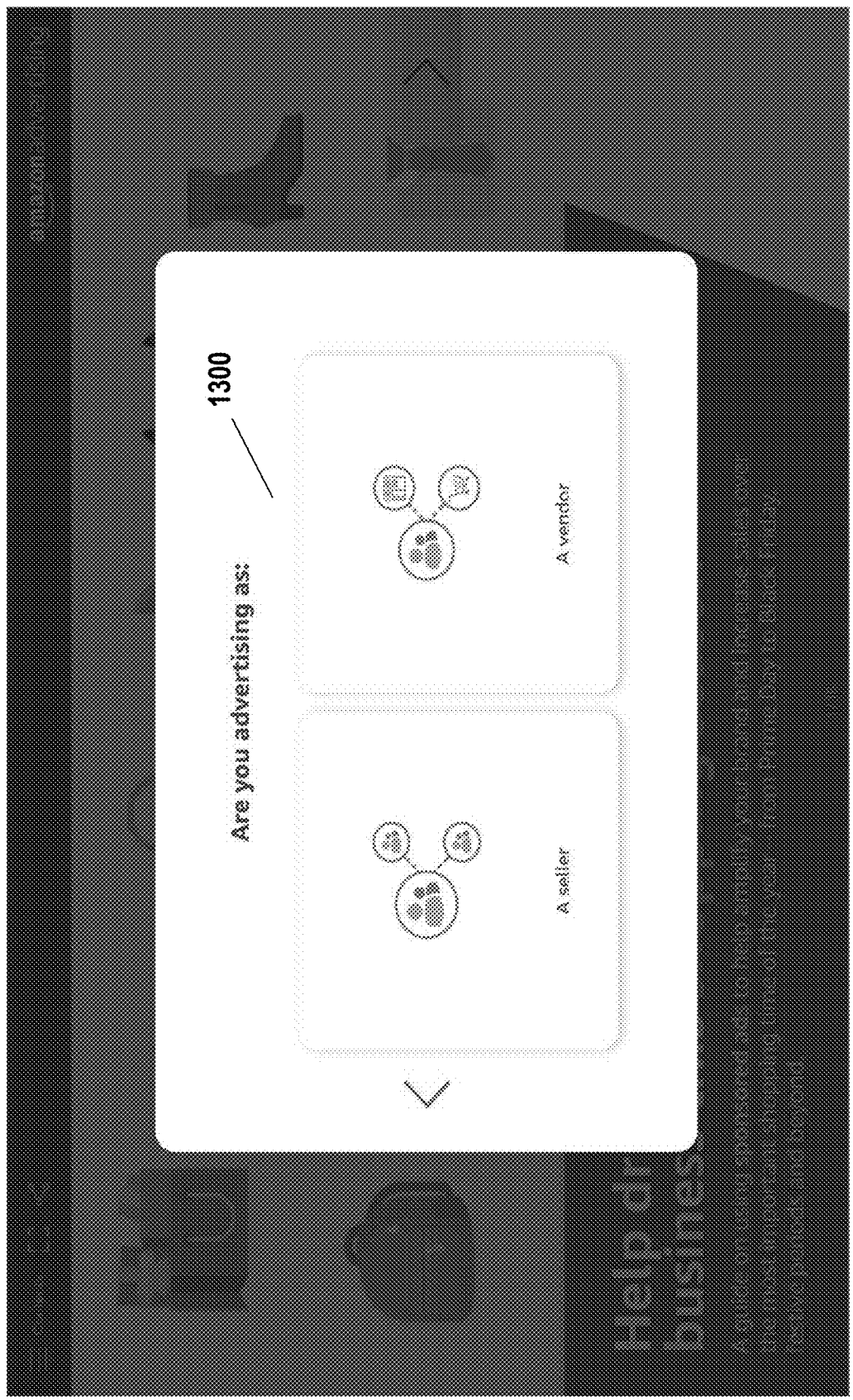
FIG. 13 and FIG. 14 show an example of a user personalizing the document as a reader of the content.
Figure 14:
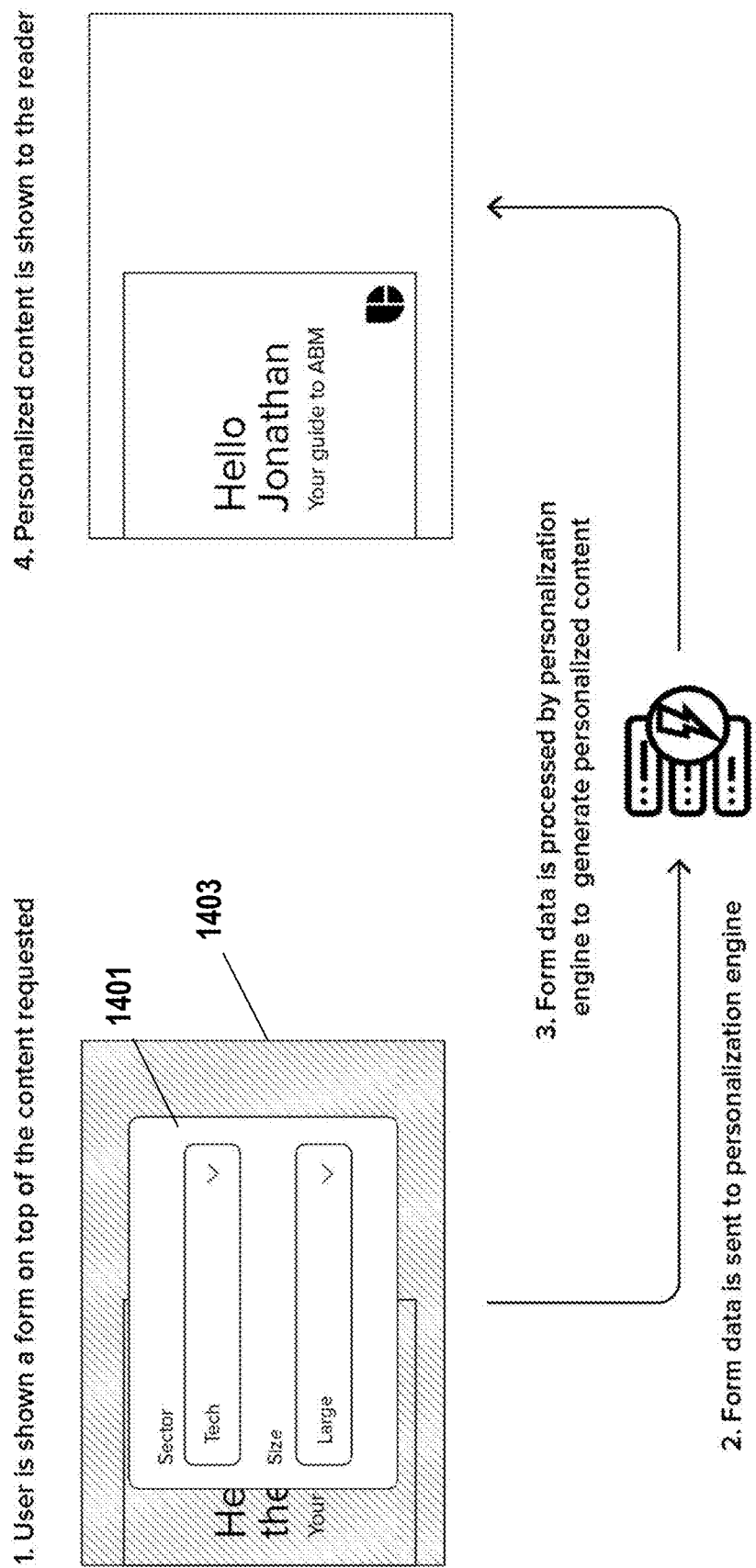

In some embodiments, the personalization form may also be filled in by both a personalizer and a reader. The system may provide a user interface allowing the users choose to access and provide information to the personalization form as a reader or a personalizer. FIG. 13 shows an example of a user interface that allows users of the system to choose to personalize the document as a reader of the content or as a personalizer (e.g., vendor, seller). For example, if the user selected to personalize the document as a reader, the user may be presented a user interface as shown in FIG. 14 where the personalization form 1401 is displayed to the user as an overlay on top of the content 1403 before they start reading the content. The assembly process and personalization process are essentially the same as those as described elsewhere herein.

Figure 15:
FIG. 15 shows an example of a user interface displaying live content when a user completes a personalization form.

In some embodiments, during the personalization such as a user filling/completing the personalization form, the system may display the content on the fly to allow users visualize the effects in real-time. FIG. 15 shows an example of a user interface displaying the content live when a user completes a personalization form. In the example, a user may use the "Back" and "Next" buttons 1501 to toggle between different stages in completing the personalization form. Upon receiving an input in a field of the personalization form, the document 1503 may automatically navigate to the relevant page and highlight the content (e.g., blocks 1505) that is related to the field. This beneficially provides a transparent visualization of the effect of the personalization parameters (e.g., field in the form) and allows users to personalize the document with real-time visual feedback.

Referring back to FIG. 2, in some embodiments, the document assembly engine 203 may comprise a content renderer for rending the assembled document. The content renderer may be configured to execute a script (e.g., JavaScript) associated with the content and display its output in the representation as defined by the script. For example, the content renderer may render the content or document as a web-page in web browser, as a document in a desktop, document-based application that is native to the operating system, in a mobile web-browser or mobile application. The content renderer may include or be coupled to a mapping engine as described above for displaying the content item in the brand theme/style mapped to the content item. For example, the mapping engine may retrieve the brand information from the brand database based on the presentation rules associated with the content item. Any change to a brand style (e.g., change of a brand style, off brand/not available, change of mapping relationship to a different brand style) may be updated at runtime and reflected upon rendering the content.

The data management unit 205 may provide the reader analytics capability that can be utilized to track, analyze and extract insight about how a reader interacts with the personalized content. For example, the document may be embedded with tracking features (e.g., web analytics tracker), insight metrics, analytics, or interfaces capable of extracting intelligence and insight for a variety of applications. For instance, data may be collected indicative of user interaction with the document. The interaction data may be analyzed to extract metrics and usage analytics measuring the degree to which slides/pages were provided or made available to and viewed by customers (e.g., the number of times a content item was pitched to customers), performance metrics measuring the degree to which readers have engaged with (e.g., read, edited, shared, saved) the interactive content (e.g., the dwell time on an item, such as the amount of time that the content was displayed in a content viewer (e.g., web browser or other application), impact analytics indicative of the content's impact on business metrics (e.g., average revenue per pitch of a content item that may be obtained from other systems, such as customer relationship management (CRM) systems, marketing automation systems, etc.), and various other analytics. Such analytics may be used to personalize a future interactive content/document.

The data management unit 205 may also be configured to manage the content data, metadata, assembly rules, analytics data, brand styles, presentation formats, and other data as described elsewhere herein in the database 230. The data management unit 205 may comprise a plurality of functional components for analyzing the collected reader interaction data, extracting intelligence and insight for improving the personalized content. The database 203 can be the same as the database as described in FIG. 1.

The creator interface 210 may be configured to permit content creators or authors to create documents and content, and define one or more assembly rules associated with a content item as described above. In some cases, the creator interface may include a graphical user interface (GUI) that can be integrated into other applications (e.g., interactive content creation application) or webhooks that can be integrated into other applications. A user (e.g., creator, author) may preview, edit, save, create document, content items, and assembly rules via the GUI.

In some embodiments, the GUIs may be rendered on a display screen on a user device (e.g., a user device). The user interfaces and functionality described herein may be provided by software executing on the user's computing device, by the system 200 located remotely that is in communication with the computing device via one or more networks, and/or some combination of software executing on the computing device. The user interfaces may be provided by a cloud computing system.

The personalizer interface 220 may be configured for representing one or more personalization fields for a user to personalize a selected document. In some cases, the personalizer interface may provide a graphical user interface (GUI) that can be integrated into other applications (e.g., enterprise applications) or API/webhooks that can be integrated into other applications. A user (e.g., personalizer) may preview, edit, save, publish a personalized document, and provide personalization parameters via the GUI.

One or more of the multiple components may be coupled to a database 230. The database can be the same as the database 111, 123 as described in FIG. 1. In some cases, the system may implement one or more trained predictive models to generate or update the assembly rules, analyze reader interaction data, extract insight and intelligence and perform various other functions as described herein. The content creation and management system may implement the methods described with respect to FIG. 7.

Figure 7:
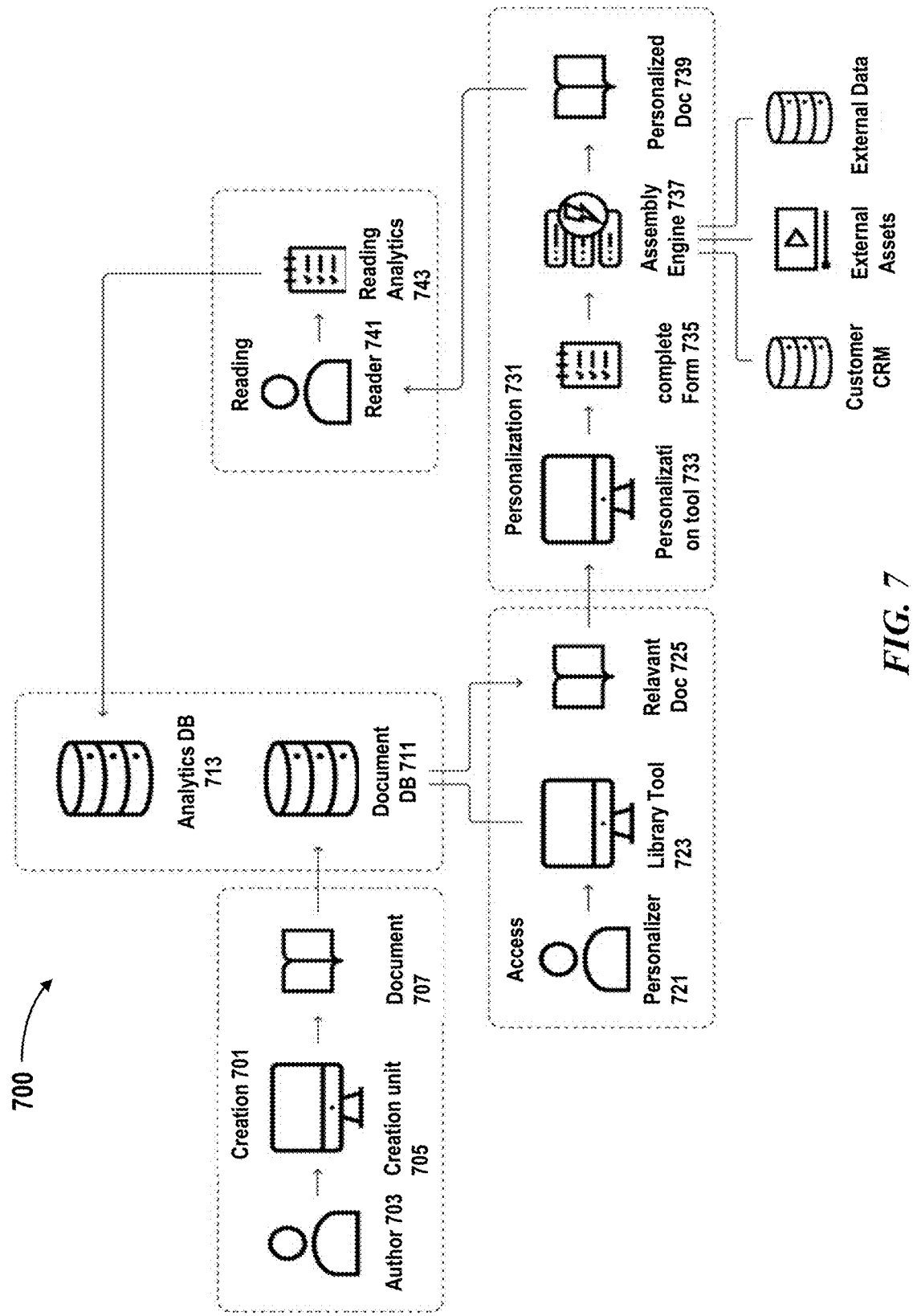
FIG. 7 illustrates an example of a process of generating personalized, interactive content, in accordance with some embodiments described herein.

FIG. 7 illustrates an example of a process 700 of generating personalized, interactive content 739, according to some embodiments described herein. At a content creation stage 701, a content creator or author 703 may create a document or content 707 using a content creation unit 705. For example, the content creation unit may provide a client software (i.e., software applications installed on the creator's devices) that may be available either as downloadable software or mobile applications for various types of computer devices as described above. Alternatively, the client software can be implemented in a combination of one or more programming languages and markup languages for execution by various web browsers. For example, the client software can be executed in web browsers that support JavaScript and HTML rendering, such as Chrome, Mozilla Firefox, Internet Explorer, Safari, and any other compatible web browsers. The various embodiments of client software applications may be compiled for various devices, across multiple platforms, and may be optimized for their respective native platforms. The client software tool 705 may also permit the author 703 to add, edit, and modify one or more rules associated with a document, content or content item (e.g., document page, slides, etc.). The one or more rules may include assembly rules and/or presentation rules (e.g., brand styles) as described above.

The created document may be stored as structured data such as JavaScript object notation (JSON) data in the document database 711. For example, the document may be stored in a pre-defined document schema that contains the content data and metadata needed to render each document (e.g., mapping relationship to a brand style), and data about the assembly rules for selecting a content item for display. In some cases, the document database 711 may also store the brand styles data. Alternatively, the brand styles may be stored in a separate database or can be retrieved from external data sources using the mapping relationship.

A personalizer 721 (e.g., marketing managers, content managers, sales people, recruiters, marketers, etc.) may access the system for customizing and personalizing a document created by the authors. The personalizer 721 may select one or more documents 725 for customization via a library tool 723 provided by the system. The personalizer 721 may proceed to input one or more personalization parameters for personalizing the selected document (personalization stage 731). The one or more personalization parameters may be provided via a personalization interface 733 as described above. For instance, a form may be generated upon receiving a user input indicating the document to be personalized. The form may be displayed on a user interface to the personalizer with one or more auto-populated fields prompting the user to select one or more options for personalizing the document. Upon completion of the form 735, the assembly engine 737 of the system may retrieve the relevant content items (e.g., document pages, content elements within a page) from the document database 711 and generate a personalized document 739. In some cases, the assembly engine may retrieve content items from external data sources such as customer CRM, or other external assets and databases based on the assembly rules embedded in the content item of the selected document.

The personalized document 739 may be rendered and output for display to a reader 741. For example, the personalized document may be provided to readers with tracking features or interfaces capable of extracting intelligence, reading analytics and insight 743 for a variety of applications. For instance, the document may be rendered within a browser and a web analytics tracker may be used for collecting data about how the reader interacts with the document, content items or web page.

In some cases, the personalized document may include interactive features for a reader to actively interact with one or more content items. For instance, a reader may be permitted to browse, filter, or select a content item (e.g., page, video) for viewing. In some cases, the interactive features may include a survey requesting reader's input. In some cases, analytics features such as NLP engine to process the input data (e.g., input text captured from the survey) and produce a structured output including the linguistic information. The NLP engine may employ any suitable NLP techniques such as a parser to perform parsing on the input text. A parser may include instructions for syntactically, semantically, and lexically analyzing the text content of the user input and identifying relationships between text fragments in the user input. The parser makes use of syntactic and morphological information about individual words found in the dictionary or "lexicon" or derived through morphological processing (organized in the lexical analysis stage).

As used herein, "or" is inclusive and not exclusive, unless expressly indicated otherwise by context. Therefore, "A or B" means "A, B, or both," unless expressly indicated otherwise or indicated otherwise by context. Moreover, "and" is both joint and several, unless expressly indicated otherwise or indicated otherwise by context.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for automatically assembling an interactive document comprising:
    a server in communication with a plurality of user devices over a network, wherein the server comprises:
    a memory for storing a set of software instructions, and one or more processors configured to execute the set of software instructions to:
    (a) embed a first set of rules into a first modular item of a first document, wherein the first document comprises a first set of modular items;
    (b) receive one or more parameters for personalizing the first document to generate a derivative document;
    (c) select to display or hide at least the first modular item from the first document based at least in part on a value of the one or more parameters and the first set of rules or pull a second modular item from a second document based at least in part on the value of the one or more parameters and a second set of rules embedded with the second modular item, wherein the second document comprises a second set of modular items, and wherein the first document and the second document are master documents that one or more of the first set of modular items and one or more of the second set of modular items are embedded with rules; and
    (d) generate the derivative document by assembling the second modular item with the first document or by displaying or hiding the at least first modular item from the first document, wherein the derivative document comprises a plurality of modular items that are not embedded with rules.

2. The system of claim 1, wherein the first modular item is stored in a structured data that defines the first set of rules.

3. The system of claim 1, wherein the first set of rules define a link between the first modular item and another document or a rule for assembling the first modular item into a derivative document.

4. The system of claim 1, wherein the value of the one or more parameters is specified by a user via a user interface.

5. The system of claim 4, wherein the user interface displays one or more personalization fields that are automatically generated based on the first set of rules.

6. The system of claim 5, wherein at least one of the one or more personalization fields is generated based on the second set of rules associated with the second modular item.

7. The system of claim 5, wherein the one or more processors are further configured to: upon receiving an input in a given personalization field, display at least a portion of the content from the first document that is related to the given personalization field.

8. The system of claim 1, wherein the value of the one or more parameters is specified by a user in a text file.

9. The system of claim 1, wherein the first set of rules includes a mapping relationship that maps the first modular item to a style for rendering the first modular item.

10. The system of claim 9, wherein the derivative document is displayed to a reader using the mapped style.

11. The system of claim 10, wherein the server is configured to collect data about the reader's interaction with the derivative document to extract insight data.

12. The system of claim 1, wherein the one or more processors are configured to further receive an instruction for personalizing the first modular item or the second modular item.

13. The system of claim 1, wherein the one or more processors are configured to further store the one or more parameters and a reference to the first document for updating the derivative document.

14. The system of claim 13, wherein the one or more processors are configured to further convert the derivative document into a master document by storing the one or more parameters as a set of rules associated with the derivative document.

15. A system for personalizing an interactive document comprising:

a memory for storing a set of software instructions, and one or more processors configured to execute the set of software instructions to:
  (a) create one or more modular items of a first document, wherein at least one modular item is embedded with a first set of rules defining a link between the at least one modular item and a second document or a first set of rules for assembling the at least one modular item into a derivative document;
  (b) receive an instruction for personalizing the first document;
  (c) assemble a plurality of modular items to generate the derivative document of the first document, wherein the plurality of modular items comprise the at least one item displayed or hidden from the given document based on the first set of rules and the instruction or the plurality of modular items are pulled from the first document and the second document based at least in part on the first set of rules embedded with the at least one modular item of the first document, wherein the first document and the second document are master documents that one or more modular items of the second document are embedded with rules; and
  (iii) render the derivative document using a style associated with the first document and wherein the plurality of modular items of the derivative document are not embedded with rules.

16. The system of claim 15, wherein the one or more processors are further configured to provide a first user interface for receiving a user input to generate the first set of rules.

17. The system of claim 16, wherein the first user interface displays a plurality of fields for defining the first set of rules.

18. The system of claim 15, wherein the one or more processors are further configured to provide a second user interface for receiving user input to customize the one or more modular items.

19. The system of claim 15, wherein the first set of rules embedded with the at least one item of the first document includes a mapping relationship that maps the at least one item to the style.

20. The system of claim 15, wherein the one or more processors are further configured to provide a user interface for receiving the instruction for personalizing the first document.

* * * * *